United States Patent [19]
Beigel et al.

[11] Patent Number: 5,235,326
[45] Date of Patent: Aug. 10, 1993

[54] MULTI-MODE IDENTIFICATION SYSTEM

[75] Inventors: Michael L. Beigel, Corona, Calif.; Nathaniel Polish, New York, N.Y.; Robert E. Malm, Pacific Palisades, Calif.

[73] Assignee: Avid Corporation, Norco, Calif.

[21] Appl. No.: 746,129

[22] Filed: Aug. 15, 1991

[51] Int. Cl.$^5$ .............................................. H04Q 7/00
[52] U.S. Cl. ............................... 340/825.54; 340/572; 340/825.34
[58] Field of Search ...................... 340/825.54, 825.34, 340/825.69, 825.72, 572; 455/41, 106, 107; 342/40, 44; 235/492, 380

[56] References Cited

U.S. PATENT DOCUMENTS

| | | | |
|---|---|---|---|
| 4,333,072 | 6/1982 | Beigel | 340/825.54 |
| 4,364,043 | 12/1982 | Cole et al. | 340/825.54 |
| 4,494,545 | 1/1985 | Slocum et al. | 128/419 P |
| 4,510,495 | 5/1985 | Sigrimis et al. | 340/825.54 |
| 4,561,443 | 12/1985 | Hogrefe et al. | 128/419 PG |
| 4,681,111 | 7/1987 | Silvian | 128/419 PT |
| 4,691,202 | 9/1987 | Denne et al. | 340/825.54 |
| 4,730,188 | 3/1988 | Milheiser | 340/825 |
| 4,857,893 | 8/1989 | Carroll | 340/825.54 |
| 4,899,157 | 2/1990 | Sanford et al. | 342/40 |
| 4,941,201 | 7/1990 | Davis | 455/41 |
| 5,008,661 | 4/1991 | Raj | 340/825.54 |

Primary Examiner—Donald J. Yusko
Assistant Examiner—Edwin C. Holloway, III
Attorney, Agent, or Firm—Robert E. Malm

[57] ABSTRACT

The multi-mode identification system is a short-range cooperative electronic identification system for use in the identification of fish, birds, animals, and inanimate objects. The system consists of readers and tags wherein a reader in the proximity of and inductively coupled to a tag may interrogate and obtain a response from the tag in accordance with a specified process if the tag belongs to a certain class of tags. The response consists of an identification code unique to the tag together with data supplied by sensors incorporated within the tag. Tags are minuscule in size and intended to be implanted within living tissue or concealed beneath the surface of inanimate objects. Communication between tag and reader is accomplished by a reader establishing a reversing magnetic field in the vicinity of a tag and the tag varying its absorption of power from the field in accordance with the information to be transmitted. The reader detects these variations in power absorption and extracts from these variations the information transmitted by the tag. The multi-mode reader is capable of generating a magnetic field at a plurality of frequencies and is capable of extracting information in accordance with a plurality of protocols thereby permitting the reader to be used with tags of different designs and made by different manufacturers.

75 Claims, 15 Drawing Sheets

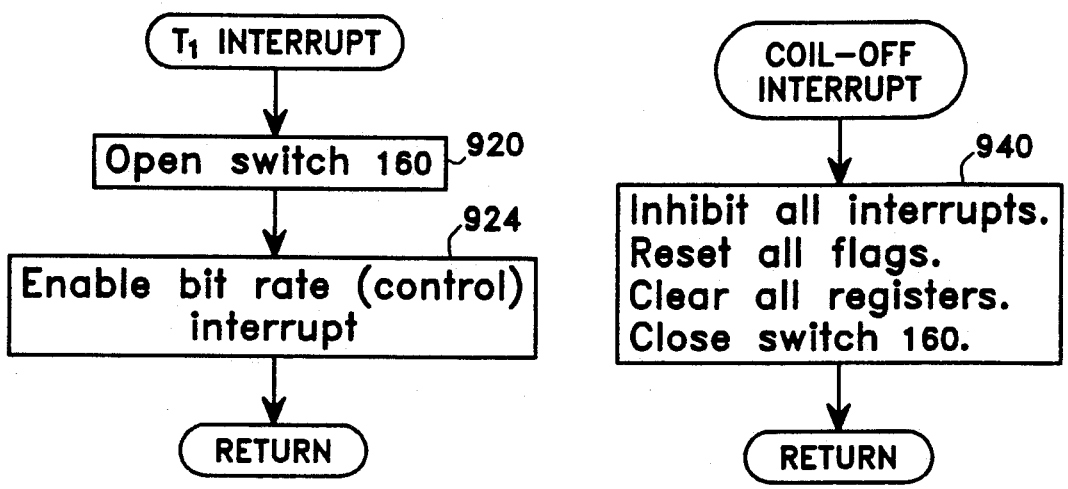
FIG. 14
FIG. 16
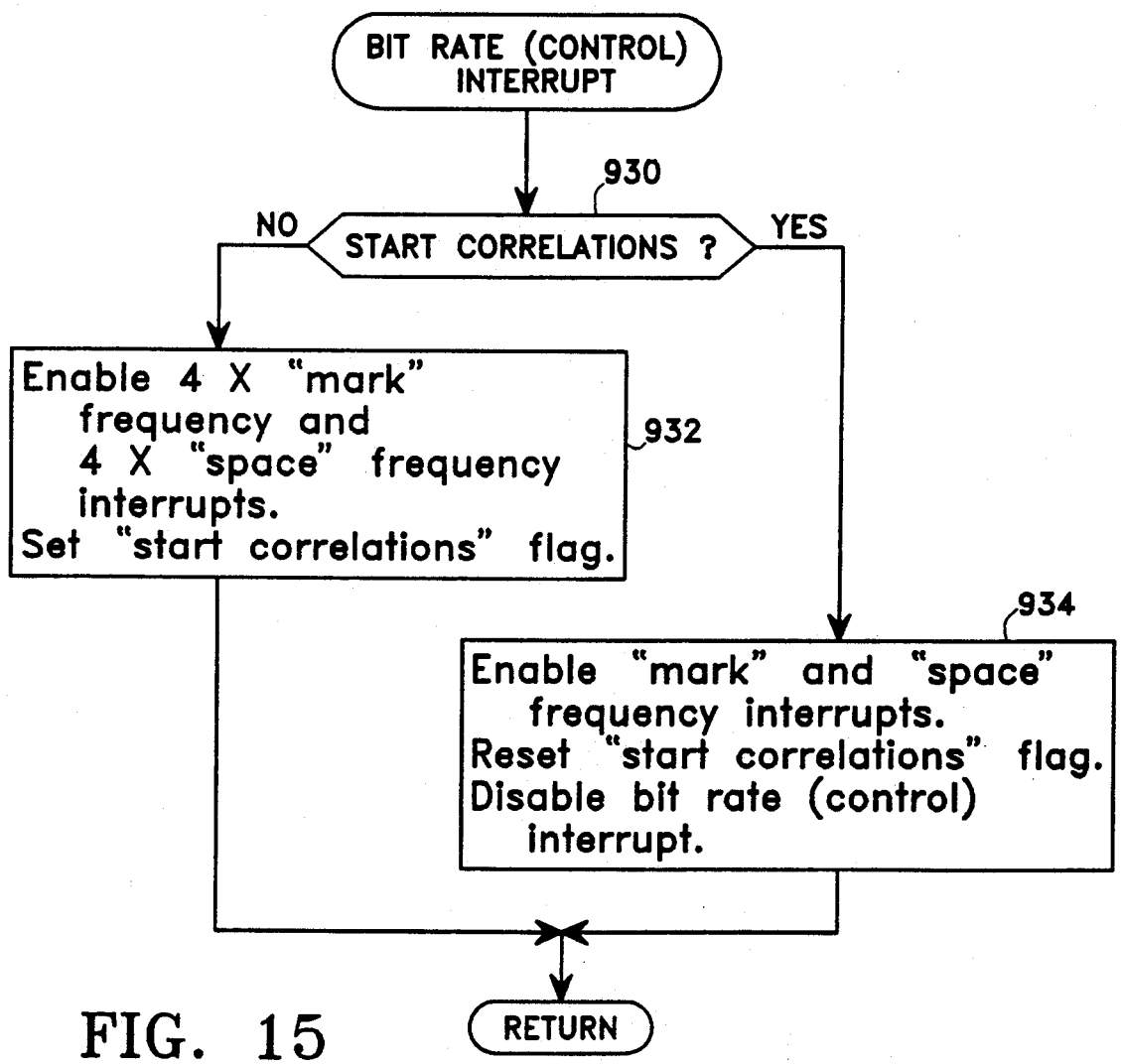
FIG. 15

MULTI-MODE IDENTIFICATION SYSTEM

BACKGROUND OF INVENTION

This invention relates to cooperative identification systems (which had their electronic beginnings in World War II as Identification—Friend or Foe Systems) in which the identifying agency and the object to be identified cooperate in the identification process according to a prearranged scheme. More specifically, the invention relates to systems consisting generically of an interrogator-responsor (or "reader") inductively coupled to a transponder (or "tag") where the reader is associated with the identifying agency and the tag is associated with the object to be identified.

Such systems are being used or have the potential of being used for identifying fish, birds, animals, or inanimate objects such as credit cards. Some of the more interesting applications involve objects of small size which means that the transponder must be minute. In many cases it is desirable to permanently attach the tag to the object which means implantation of the device in the tissues of living things and somewhere beneath the surfaces of inanimate objects. In most cases, implantation of the tag within the object forecloses the use of conventional power sources for powering the tag. Sunlight will usually not penetrate the surface of the object. Chemical sources such as batteries wear out and cannot easily be replaced. Radioactive sources might present unacceptable risks to the object subject to identification. One approach to powering the tag that has been successfully practiced for many years is to supply the tag with power from the reader by means of an alternating magnetic field generated by the reader. This approach results in a small, highly-reliable tag of indefinite life and is currently the approach of choice.

For many applications, convenience and utility dictate that the reader be hand-portable which translates into the use of batteries to power the unit. However, the size and weight of batteries having the requisite capacity to perform the identification function at reasonable ranges without interruption challenge the very concept of hand-portability. The twin goals of ease of use and system performance have been the subject of uneasy compromise in the past. There is a need to harness the recent advances in technology to the design of energy efficient systems in order to realize the full potential of identification systems based on inductive coupling.

In order to minimize the trauma associated with implanting the tag in living creatures and also as a matter of convenience and utility, the tag should be small enough to be implanted by means of a syringe-type instrument rather than by surgery. This approach has been proved out in present-day systems and is likely to continue to be the implantation procedure of choice in the future. The size of present-day tags are reasonable insofar as the larger specimens are concerned. However, size reduction is necessary if the tags are to be used with the smaller animals, birds, and fish.

As identification systems of this type proliferate and users multiply, it becomes important to recognize this changing environment in the design of next-generation identification apparatus. Newer-model readers should be able to read older-model tags. Users' privacy and security interests must be respected—one user should not be able to read another user's tags. And finally, in this computer-driven world, it must be possible to conveniently interface readers with computers.

BRIEF SUMMARY OF INVENTION

The multi-mode identification system is comprised of readers and tags wherein a reader in the proximity of and inductively coupled to a tag may interrogate and obtain a response from the tag in accordance with a specified process if the tag belongs to a certain class of tags. The response consists of an identification code unique to the tag together with data supplied by sensors incorporated within the tag.

The tags are comprised of capacitors, inductors, transistors, and possibly other solid-state devices packaged in forms adapted for attachment to or implantation in animate or inanimate objects. The basic configuration of a tag consists of a multi-turn coiled conductor that develops a voltage across its terminals in response to a reversing interrogating magnetic field produced by a reader and passing through the coil; a capacitor in parallel with the coil, the combination being resonant at some interrogating magnetic field frequency; an AC-to-DC converter bridged across the resonant circuit which extracts AC power from the magnetic field and delivers DC power to all of the tag circuits; a controller (or microprocessor) which controls all operations in the tag; a clock generator which utilizes the induced signal across the resonant circuit to generate all required clock signals for tag operations; a threshold detector which provides a reset signal to the controller when the AC-to-DC converter output voltage reaches a level sufficient to operate all of the tag circuitry; non-volatile memory, accessible to the controller, containing the tag identification code; sensors for measuring environmental parameters such as temperature, shock, and vibration, and in the case of living tag carriers, blood sugar level and PH factor; an A/D converter that can be selectively connected to each of the sensors for converting the analog sensor outputs to digital representations; and a resonant circuit loading means which enables the controller to place a varying load on the resonant circuit in accordance with a serial bit stream comprising the tag identification code and the environmental data.

The tag is physically comprised of a semiconductor chip incorporating the devices and circuitry of the tag including the tuning capacitor and a multi-turn coiled conductor which is attached to the semiconductor chip, the combination being sealed within a glass tube or other appropriate container.

The portable version of the reader is adapted for operation by batteries. For fixed installations the reader is adapted for operation from alternating current power sources.

A multi-turn coiled conductor in the reader provides the means for inductively coupling the reader to the coil in a tag when the two units are in proximity of one another. Capacitors are placed in series with the coil to create a circuit resonant at the same frequency as the resonant circuit in the tag to be read. Provision is made for the near-instantaneous selection of capacitance or coil inductance values so that the resonant frequency of the reader can be selected to match the resonant frequency of the tag.

The reader resonant circuit is driven at the resonant frequency by a balanced double-ended coil driver which is supplied with a periodic signal of appropriate frequency by a clock generator. The clock generator also supplies all timing signals required in the operation of the reader.

When the reader and tag are in the proximity of and inductively coupled to each other, the voltage across the reader coil is modulated in amplitude according to the loading pattern applied to the tag resonant circuit when the tag responds to an interrogation from the reader. This variation in amplitude, which is a measure of the power absorbed by the tag from the reversing magnetic field, is detected by means of an envelope detector.

The signal-to-noise ratio of the envelope detector signal is maximized by appropriate filtering and the signal is then digitized by an A/D converter. The digitized envelope detector signal is supplied to a microprocessor which extracts the data transmitted to the reader by the tag.

In order to read tags which transmit information by causing the voltage across the reader coil to vary in phase and/or frequency as well as amplitude, another embodiment of the invention is preferred. A notch filter tuned to the driving frequency of the reader coil is substituted for the envelope detector and the output signal from the notch filter is digitized and supplied to the microprocessor which extracts the data from the signal. The purpose of the notch filter is to suppress the huge driving signal that is present in the coil signal thereby reducing the dynamic range required of the A/D converter.

The microprocessor interprets the data and places it in a form suitable for display to the user. The microprocessor also supplies audio signals and/or artificial speech that are intended to inform and guide the user in his use of the reader.

The reader can be configured to operate in a variety of modes by means of hardware and firmware switches actuated by mode control data contained in a read-only memory within the reader. Among the parameters that can be controlled by mode control data are operating frequency, demodulation protocols, error control protocols, tag classes, and search sequencing among tag classes.

The tag class is a group of tags that the reader is enabled to recognize. A tag class code may identify tags of a particular design, tags from a particular manufacturer, tags utilized by particular user groups, tags utilized for the identification of particular species of objects, etc. Thus, an operating mode which specifies a single tag class may restrict the reader to recognizing responses from tags of a particular design from a certain manufacturer that are utilized by a particular user group for the identification of particular species.

The mode control data may specify more than one tag class in which case the reader is permitted to recognize an expanded population of tags. If the mode control data specifies more than one tag class, then the reader either interrogates all classes simultaneously or proceeds from one class to the next in sequence until all of the classes have been interrogated, at which point the interrogation process repeats.

In searching an object for a tag, the reader is moved over the surface of the object until either a tag response is received or the surface of the object where the tag might be located has been completely scanned. The determination by the reader that a tag belonging to an enabled class is responding occurs within a specific period of time (the detection time) after the reader begins to transmit. If the reader does not obtain a response within the detection time, the reader turns off so as to conserve battery power. The reader turns on again and performs another interrogation after a second specific period of time (the repositioning time) has elapsed. This repositioning time is long enough to permit the reader to be moved to a new location on the surface of the object. This power-on/power-off process is a very effective means for conserving battery power in the reader.

One object of the invention is to provide an identification system comprising readers and tags wherein a reader is restricted to recognizing only certain classes of tags. A second object of the invention is to provide a general-purpose reader that can produce responses from a variety of tags of different designs and that can recognize and decode the responses from these differently-designed tags. A third object of the invention is to enable the reader to read the tag message on the basis of a one-time transmission thereby permitting the reader to conserve battery power by turning itself off immediately after the one-time transmission. This object is achieved by delaying the tag response until the reader is ready to receive thereby assuring that the reader does not begin reading the data midway through the message transmission. A fourth object of the invention is to integrate the coil, capacitor, and circuitry that comprise a tag to the highest degree that the technology will allow.

BRIEF DESCRIPTION OF DRAWINGS

FIG. 14 is the flow diagram of the $T_1$ Interrupt Routine that is performed by the microprocessor in the reader.

FIG. 15 is the flow diagram of the Bit Rate (Control) Interrupt Routine that is performed by the microprocessor in the reader.

FIG. 16 is the flow diagram of the Coil-Off Interrupt Routine that is performed by the microprocessor in the reader.

DESCRIPTION OF THE PREFERRED EMBODIMENT

Figure 1:
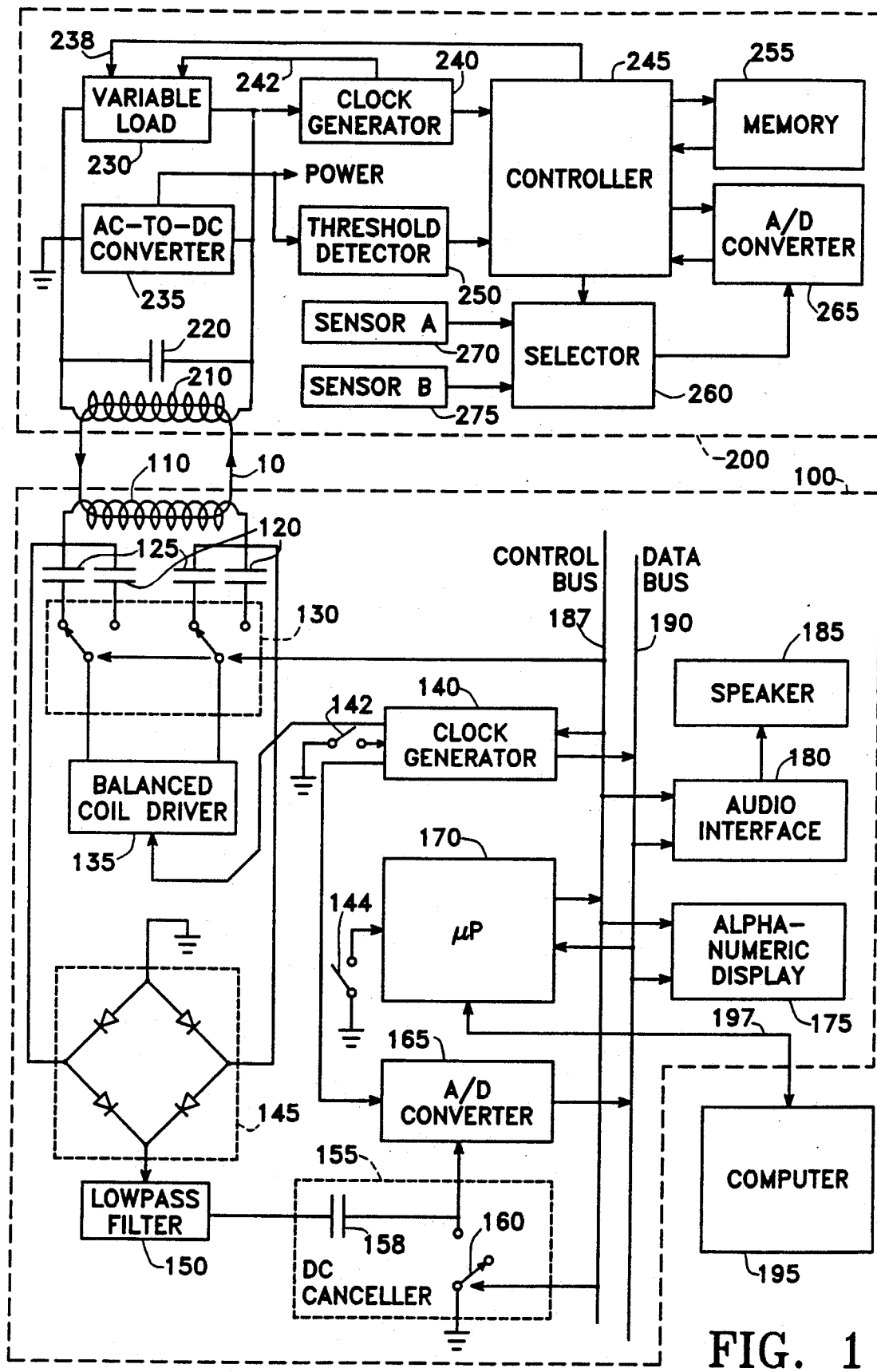
FIG. 1 is a functional block diagram of the multimode identification system including reader and tag.

The functional block diagram for an inductively-coupled reader 100 and tag 200 are shown in FIG. 1. The reader 100 interrogates the tag 200 by generating a reversing magnetic field 10 by means of the wound wire coil 110. The coil 110 in series with either capacitor pair 120 or 125, selectable by means of SPDT switch pair 130, is driven by the double-ended balanced coil driver 135 with a periodic signal of appropriate frequency supplied by the clock generator 140. Typically, the driving frequency is in the range from 100 kHz to 400 kHz.

The clock generator 140 is comprised of a crystal-controlled oscillator and divider chains of ordinary design. The oscillator frequency is chosen such that all required driving frequencies can be obtained by integer divisions. Further integer divisions of each driving frequency provide square-wave clocking signals having the following frequencies: 4 times "mark" frequency; 4 times "space" frequency; "mark" frequency; "space" frequency; bit rate (data); and bit rate (control). The clocking signals are obtained in such a way that the low-to-high transitions of all signals except the bit rate (control) signal coincide at particular instants of time. The low-to-high transition of the bit rate (control) signal precedes that of the bit rate (data) signal by at least one cycle of the driving frequency.

The clock generator 140 includes the duty cycle timer which generates a square-wave timing signal that causes the reader coil 110 to be energized when the signal is high. The signal remains high for a time long enough to receive the information to be communicated by a tag on the particular driving frequency being used. The signal remains low for a time long enough for the reader 100 to be moved to a new reading position. The duty cycle timer produces the "coil-off" interrupt signal to the microprocessor 170 when the timing signal it generates goes low.

The purpose of operating the reader coil 110 with a duty cycle is to conserve battery power and achieve longer operating periods between battery rechargings or replacements.

The duty cycle timer is set to low by the microprocessor 170 whenever the microprocessor recognizes a condition that indicates failure of the read process.

The duty cycle timer turns on only when the reader power switch is on and the user-activated "read" trigger switch 142 is closed. Releasing the "read" trigger does not disable the duty cycle timer until the normal transition from high to low occurs.

Time T is maintained in the clock generator 140 by a counter that counts cycles of the driving frequency when the duty cycle timer signal is high. The counter is reset each time the duty cycle timer signal goes from high to low. The T counter can be accessed by the microprocessor 170 by means of the control bus 187 and data bus 190.

The T counter supplies an interrupt signal to the microprocessor 170 when T equals $T_1$ where $T_1$ is the time required for the reader coil voltage to approach within say 0.1% of its steady-state voltage. When the $T_1$ interrupt occurs, signal processing in the reader begins.

A typical design for balanced drivers suitable for driving the coil 110 and capacitors 120 or 125 is commercially-available integrated circuit SI9950DY which comprises a complementary pair of power metal oxide silicon field effect transistors (power MOSFETS).

The two capacitors comprising each coil pair have equal capacitances, the capacitance being chosen so that the combination of the coil and capacitor pair constitutes a series resonant circuit at a desired driving frequency.

The tag 200, when in the proximity of and inductively-coupled to the reader 100, extracts power from the alternating magnetic field 10 established by the reader coil 110 by means of the multi-turn coiled conductor 210 in parallel with the capacitor 220, the combination constituting a resonant circuit at one of the reader's driving frequencies. The variable load 230 is connected across the coil-capacitor combination thereby providing a means for varying the load on the balanced coil driver 135 in the reader 100 resulting from the inductive coupling of the reader and tag coils. The variable load 230 is resistive in the preferred embodiment thereby achieving the greatest possible effectiveness in absorbing power from the reversing magnetic field and in communicating with the reader. Other less desirable embodiments could use loads that are inductive, capacitive, or some combination of inductive, capacitive, and resistive.

The communication capability of the reader 100 and the tag 200 are critically dependent on the characteristics of the reader coil 110 and the tag coil 210. The number of turns for the reader coil should be as large as possible so that the magnetic field created by the reader coil is a large as possible. On the other hand, the resistance of the reader coil 110 (proportional to the number of turns) must not become so large as to be a substantial mismatch to the driving impedance and thereby impede the transfer of power to the tag. The preferred embodiment of the reader coil is wound on an oval plastic core approximately 4⅝ inches long by 3¾ inches wide. The coil is wound with 90 to 100 turns of 28-gauge wire yielding a coil with approximate inductance of 2.3 mH and approximate resistance of 7.6 ohms.

The number of turns on the tag coil 210 also should be as large as possible in order to maximize the inductively-generated voltage across the coil. Again caution must be exercised in choosing the number of turns so that the power transfer between reader and tag is not adversely affected.

The alternating voltage appearing across the coil 210 as a result of being inductively coupled to the reader coil 110 is converted to direct current by means of the AC/DC converter and voltage regulator 235 which supplies all of the power required by the tag circuitry. The alternating voltage appearing across the coil 210 provides a reference frequency for the clock generator 240 which supplies all of the clocking signals required by the tag circuitry. Another embodiment utilizes the alternating coil voltage to stabilize a voltage-controlled oscillator which would then act as the source for all clocking signals.

The controller 245 controls all of the operations performed by the tag circuitry. A clock signal for the controller 245 is supplied by the clock generator 240. The threshold detector 250 produces a signal when the voltage from the AC/DC converter and voltage regulator 235 reaches the level required for reliable operation of the tag circuitry. The signal from the threshold detector 250 serves to reset the controller which waits for a predetermined period of time (measured by a clock cycle counter in the controller) and then initiates the transmission of information to the reader. The transmission delay may also be accomplished with a simple analog timing circuit. The predetermined transmission delay is for the purpose of allowing the transient associated with the application of a voltage to the reader resonant circuit 110, 120/125 to die down to the point where power absorption by the tag can be detected by the reader. The reader is thereby able to extract information from the power absorption signal as soon as the tag begins transmitting making it unnecessary for the reader magnetic field to be energized longer than the duration of a single message transmission and to be turned off quickly if a tag cannot be detected.

The threshold detector is a simple circuit that uses a Zener diode as a reference voltage.

A message is transmitted by the controller by applying a two-level signal corresponding to a message bit pattern to the variable load 230. In the preferred embodiment, a message consists of a 10-bit synchronization code, a 24-bit tag class code, a 56-bit identification code, a 16-bit error-detecting code based on the CCITT standard 16 bit checksum, and finally a predetermined number of 8-bit sensor data words. The checksum permits up to 16 bit errors in that portion of the message consisting of the tag class code and the identification code to be detected. Each of the sensor words carries its own parity bit thereby permitting single-error detection in each of the sensor data words.

The controller retrieves for transmission all but the sensor data portion of the message from the non-volatile memory 255. In the embodiment shown in FIG. 1 the controller obtains the sensor data by causing the sensor selector 260 to connect the A/D converter 265 sequentially first to temperature sensor 270 and then to a PH sensor 275 or other desired sensor.

In the absence of a message transmission from the controller 245, the variable load 230 is dormant and does not appreciably load the resonant circuit 210, 220. When the controller transmits a message over line 238 to the variable load 230, the variable load applies a load to the resonant circuit 210, 220 in accordance with a frequency-shift-keying (FSK) technique. A message bit "1" causes a "mark" frequency signal to be selected. A "0" selects a "space" frequency signal. The selection of the mark "mark" frequency signal causes the load to be turned on or off depending on whether the "mark" frequency signal is high or low. Similarly, the "space" frequency signal causes the load to be turned on or off depending on the high and low states of the "space" frequency signal. The "mark" and "space" frequency square-wave signals are derived from the reader driving frequency and supplied by the clock generator 240 to the variable load 230 over lines 242.

Since the "mark" and "space" frequencies are phase-coherent with the magnetic field driving frequency, the reader may advantageously extract the information from the power absorption signal by means of a coherent demodulation technique thereby realizing the increased communication efficiency of coherent frequency-shift keying (CFSK) as compared to non-coherent frequency shift keying (NCFSK).

The "mark" and "space" frequencies are chosen small enough that the sidebands resulting from the amplitude modulation of the driving-frequency signal are not attenuated by more than say 3 dB with respect to the driving frequency by the reader resonant circuit 110, 120/125. The spacing of the "mark" and "space" frequencies should ideally be an integer times the bit rate where the integer is preferably equal to or greater than two. For a driving frequency of 400 kHz and a bit rate of 5 kHz, typical values for the "mark" and "space" frequencies are 50 kHz and 40 kHz respectively. Note that the difference 10 kHz is equal to the integer 2 times the bit rate.

It will be obvious to one skilled in the art that other modulation techniques could be used. For example, on-off-keying (OOK) could be used whereby the variable load 230 turns the load off when a "0" is transmitted and turns the load on and off when a "1" is transmitted (or vice versa) in accordance with whether a square wave of predetermined frequency supplied by the clock 240 is high or low.

Phase-shift-keying (PSK) in either the fully-coherent (CPSK) or differentially-coherent (DCPSK) versions could also be used. Coherent phase-shift-keying would result if the variable load 230 turned the load on or off in accordance with whether the square wave described above was high or low respectively when a "0" was transmitted and turned the load on or off when the square wave was low or high respectively when a "1" was transmitted (or vice versa).

Differentially-coherent phase-shift-keying would result if the variable load 230 turned the load on and off in the same way as it was during the previous bit period when a "0" is transmitted and in the opposite way when a "1" is transmitted.

Figure 2:
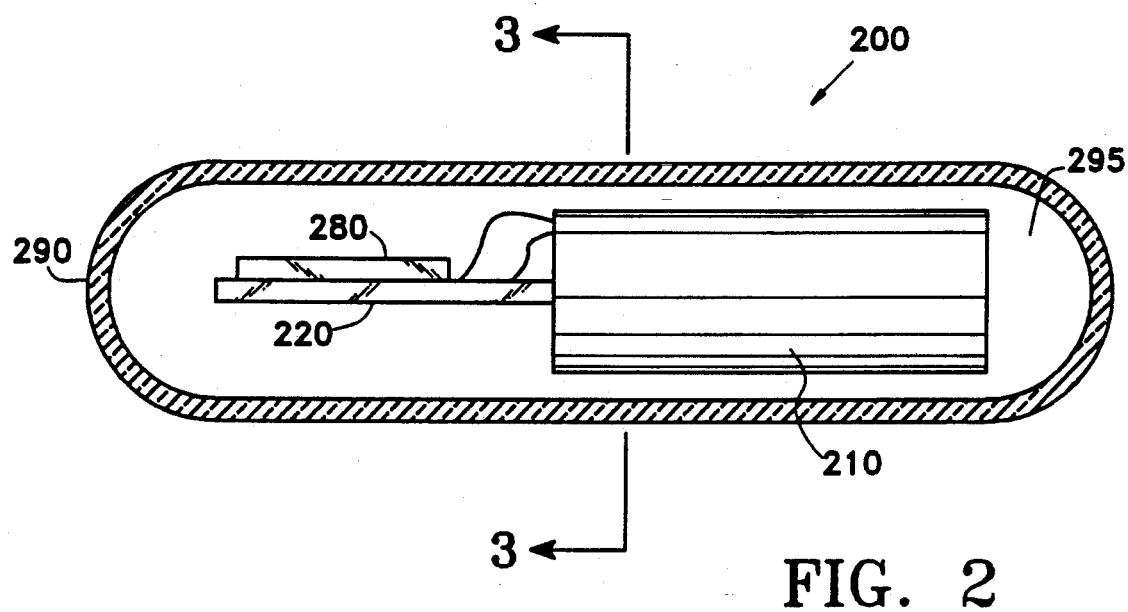
FIG. 2 is a side view of a tag designed for implantation with part of the enclosing container cut away.
Figure 3:
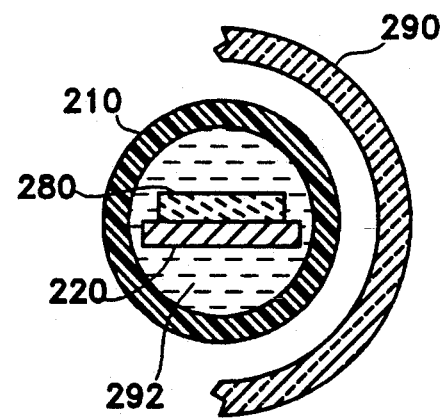
FIG. 3 is a cross-sectional view of a tag designed for implantation in a plane transverse to the longitudinal axis of the tag.

The tag circuitry for implantation-type tags is packaged to fit within a cylindrical capsule made of an inert material such as glass. A side view of the tag circuitry positioned within a cutaway view of the capsule 290 is shown in FIG. 2. A cross-sectional end view of the tag 200 is shown in FIG. 3. The capacitor 220 is formed in a substrate which serves as a support for the coil 210. The coil 210 is held immobile relative to the capacitor substrate 220 by a potting material 292 that occupies the space between the coil and the substrate. The tag circuitry other than the coil 210 and the capacitor 220 is an integrated circuit 280 affixed and electrically connected to the capacitor 220 by means of gold bumps. The tag circuitry may be cushioned within the capsule by an inert fluid 295.

In an alternative embodiment of the tag, the tag circuitry 280 and the capacitor 220 are fabricated in the same substrate thereby simplifying the assembly of the tag.

In still another embodiment of the tag, the tag circuitry 280, the capacitor 220, and the coil 210 are fabricated in the same substrate, the coil being a spirally-coiled conductor lying on the surface of the substrate.

The driving-frequency voltage across the reader coil 110 is modulated in amplitude by the variation in tag power absorption from the reader coil magnetic field that results from the variation in loading of the tag resonant circuit 210, 220 brought about by the message that the controller 245 feeds into the variable load 230. The amplitude modulation is removed from the reader coil voltage by envelope detector 145 consisting of a diode bridge and the noise extending above the modulation frequencies of interest is removed by means of the lowpass filter 150. The cut-off frequency of the lowpass filter 150 is in between the lowest driving frequency which the reader is designed to use and the highest of the "mark" and "space" frequencies. Typical driving frequencies are 400 kHz and 125 kHz. Typical "mark" and "space" frequencies for the 400 kHz driving frequency are 50 kHz and 40 kHz. Under these circumstances the cut-off frequency should be placed above 50 kHz and as far below 125 kHz as possible, so as to obtain the greatest possible attenuation of the driving frequency, without causing an attenuation greater than say 1 dB in the 50 kHz "mark" frequency.

The output signal from the lowpass filter 150 is fed through the DC canceller 155 to the analog-to-digital converter 165. The purpose of the DC canceller 155 is to remove the DC component so that the AC components can occupy the entire input range of the A/D converter 165. The DC canceller can be as simple as the circuit shown in FIG. 1—the capacitor 158 connected through the switch 160 to ground. The switch 160 is controlled by the microprocessor 170. During the initial period of reader coil 110 excitation, the capacitor 158 remains grounded through switch 160. When the reader coil voltage approaches steady state, switch 160 is opened and the input to the A/D converter 165 is zero, since the voltage across capacitor 158 equals that out of the lowpass filter 150 and the two voltages are now connected in series opposition.

The A/D converter 165 samples the input waveform at times corresponding to the rising transitions of the 4 times "mark" frequency and the 4 times "space" frequency clocking signals supplied by the timing generator 140 thereby producing 10-bit digital representations of the input samples. The "4 times" sampling rates provide four samples during each cycle of the "mark" and "space" frequencies which simplifies subsequent processing operations.

Another embodiment of the invention is used when tags to be identified include those that transmit information by causing the phase or frequency of the reader coil voltage to vary. An example of such tags are those that respond to an interrogating reversing magnetic field with an FSK or PSK signal after the field is turned off. Such signals would not survive the envelope detector 145 and lowpass filter 150 and consequently, a different means of demodulation is required to receive these signals.

In the alternative embodiment of the invention, the envelope detector 145, the lowpass filter 150, and the DC canceller 155 are replaced by a notch filter tuned to the driving frequency of the reader coil 110 and the microprocessor 170 performs the entire signal demodulation process. By proper programming of the microprocessor, the complete gamut of amplitude, phase, and frequency modulation formats can be accommodated within the reader 100. The purpose of the notch filter is to suppress the driving frequency component of the alternating coil voltage, thereby permitting the use of an A/D converter with a smaller dynamic range.

In either embodiment, the microprocessor 170 obtains the samples digitized by the A/D converter 165 as soon as they are available and stores them in memory. The tag identification data that derives from this information together with operational information is visually displayed on alpha-numeric display 175. This same information is made available audibly to the user in the form of audio signals and/or artificial speech by means of the audio interface 180 and the speaker 185. The microprocessor exercises control over the clock generator 140, the DC canceller 155, the alpha-numeric display 175, and the audio interface 180 by means of the control bus 187. Data is exchanged between the microprocessor 170 and the clock generator 140, the A/D converter 165, the alpha-numeric display 175, and the audio interface 180 by means of the data bus 190.

An external digital computer 195 can exercise control over and exchange data with the microprocessor 170 by means of the standard RS-232 data link 197.

Figure 4A:
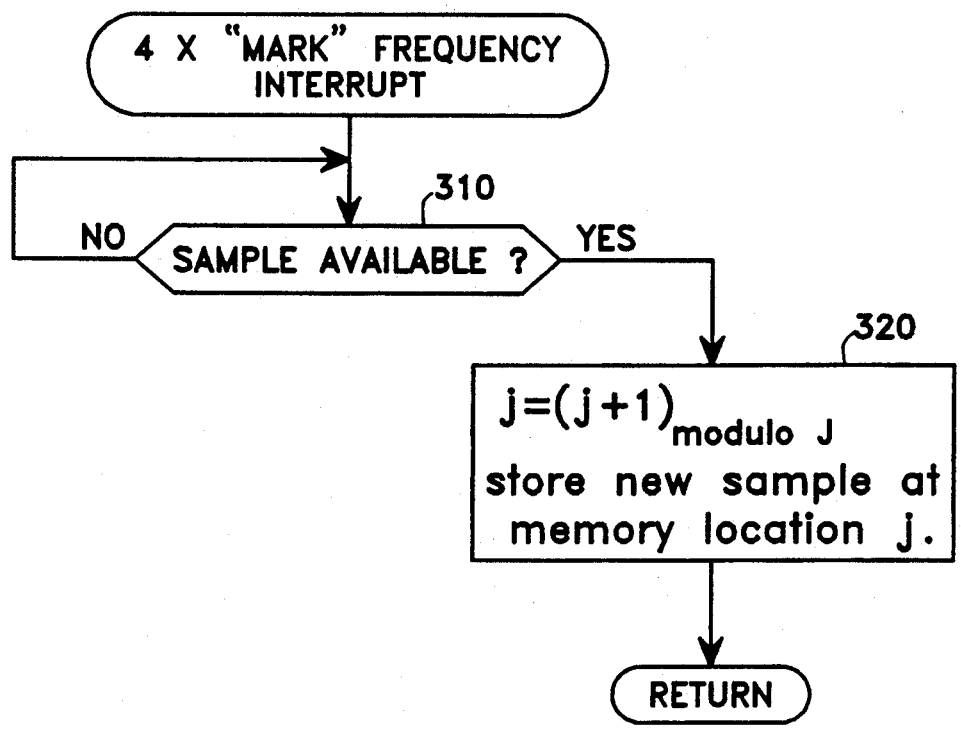
FIG. 4A is the flow diagram of the 4 Times "Mark" Frequency Interrupt Routine that is performed by the microprocessor in the reader.
Figure 5A:
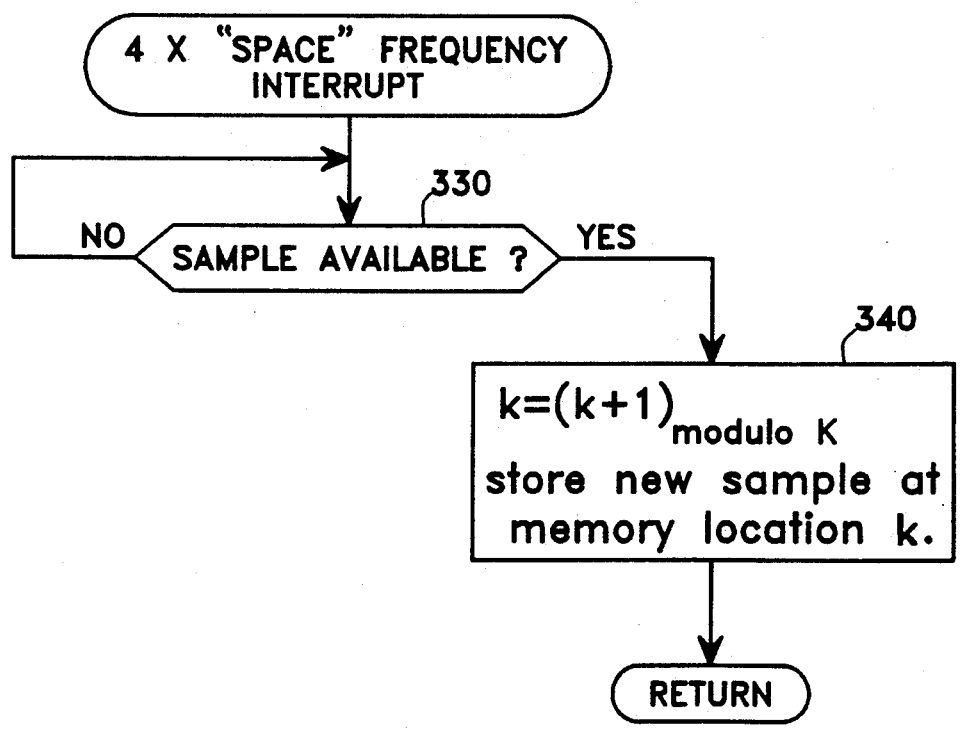
FIG. 5A is the flow diagram of the 4 Times "Space" Frequency Interrupt Routine that is performed by the microprocessor in the reader.

The routines for storing the A/D converter data in microprocessor memory are defined by the flow diagrams shown in FIGS. 4A and 5A for the first embodiment involving the envelope detector. The routines are triggered by microprocessor interrupts that are generated by the same clocking signals that control sampling in the A/D converter 165.

The routine shown in FIG. 4A is initiated by the rising transition of the "4×'mark' frequency" clock signal. The microprocessor performs the "waiting" operation 310 until the digitized sample is available from the A/D converter 165 and then performs the operation 320. There are J memory cells available for sample storage in this routine where J is equal to $4f_m/R$, $f_m$ is the "mark" frequency, and R is the bit rate. The memory cells are identified here by the integers between 0 and (J−1). The operation 320 consists of two steps. The memory address register is incremented by 1 with a subsequent modulo J operation. Then the new sample is stored at the address contained in the memory address register where the oldest sample previously resided.

A similar routine is initiated by the rising transition of the "4×'space' frequency" clock signal in accordance with the flow diagram shown in FIG. 5A. The FIG. 5A routine differs from the FIG. 4A routine only in that a different memory space is involved. The FIG. 5A routine involves K memory cells where K is equal to $4f_s/R$ and $f_s$ is the "space" frequency. The memory cells for this routine are identified by the integers from 0 to (K−1).

The microprocessor is a conventional digital processor such as Motorola's 68030 or Intel's 80386 capable of operating at a clock rate between 15 and 30 MHz and capable of performing the operations that have just been described as well as those that will subsequently be described. The clock signal for the microprocessor 170 is supplied by the clock generator 140.

The samples stored in the microprocessor memory constitute a digital representation of a frequency-shift-keyed signal if the responding tag is the preferred embodiment discussed earlier. The key step in extracting the information content from the signal, i.e. the message bits, is to compute estimates of the relative probabilities that either a "mark" or "space" frequency was transmitted during a given time period. The most effective way of accomplishing this task when the received signal is contaminated with white noise is to cross-correlate the received signal with replicas of the "mark" and "space" frequency signals that would be received in the absence of noise. The cross-correlations are the desired estimates of the relative probabilities.

Figure 6A:
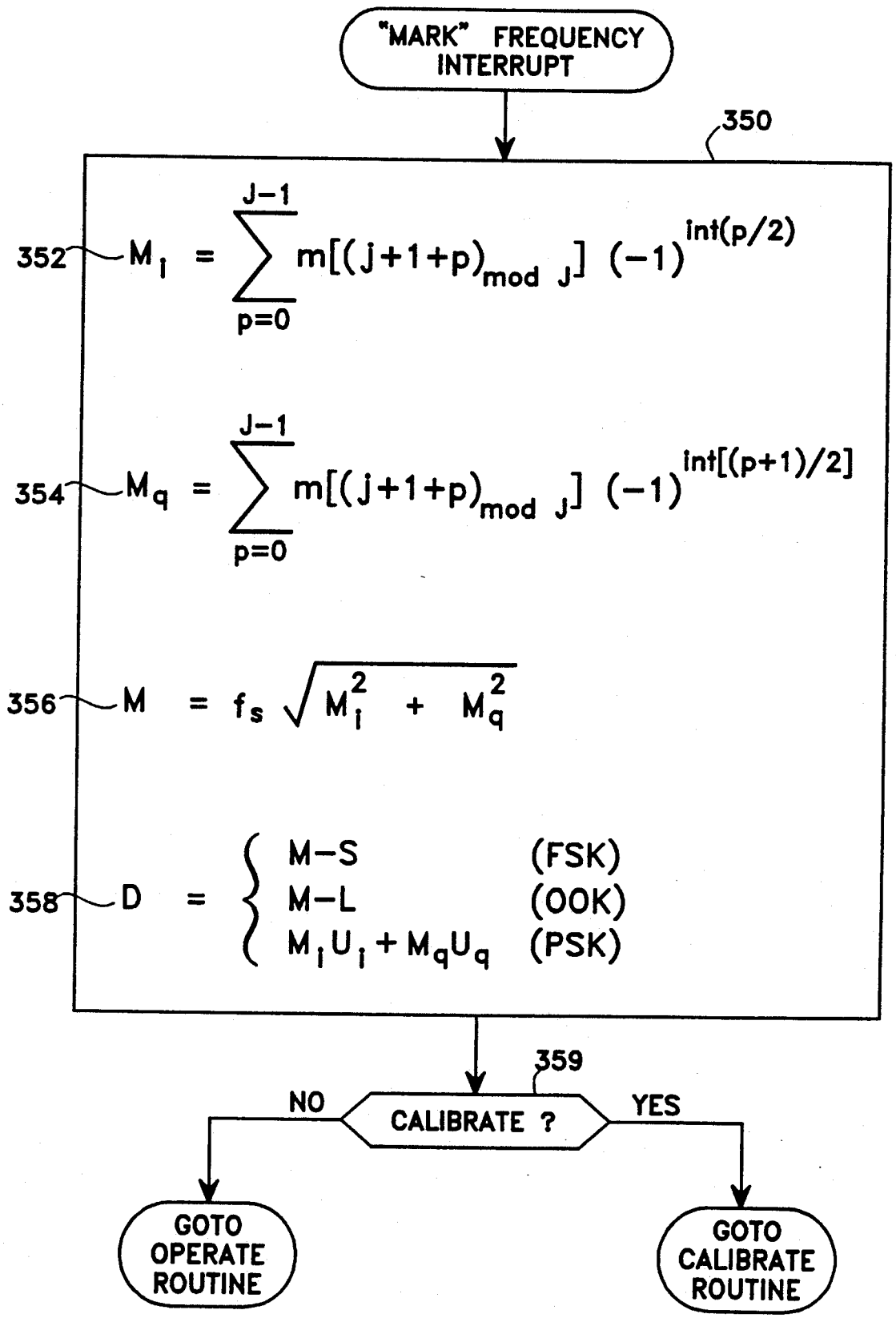
FIG. 6A is the flow diagram of the "Mark" Frequency Interrupt Routine that is performed by the microprocessor in a first embodiment of the reader.
Figure 7A:
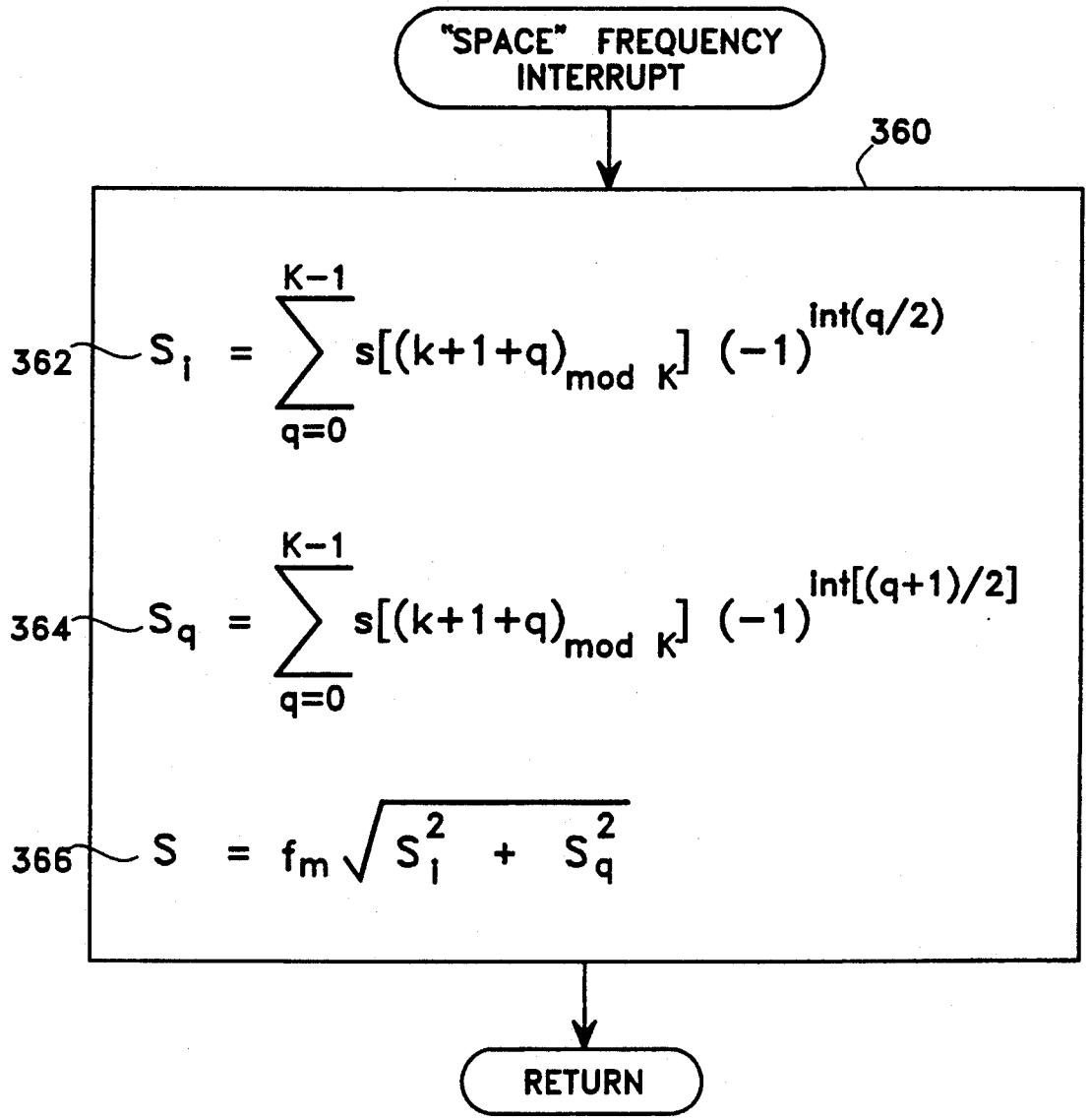
FIG. 7A is the flow diagram of the "Space" Frequency Interrupt Routine that is performed by the microprocessor in a first embodiment of the reader.

The microprocessor 170 computes cross-correlations in accordance with the interrupt routines shown in FIGS. 6A and 7A. The routine shown in FIG. 6A is triggered by the rising transitions of a square-wave clock signal having a frequency equal to the "mark" frequency. The computations 350 utilize the data stored in memory as a result of the routine shown in FIG. 4A. The result of the computations 350 in an estimate of the relative probability that a "mark" frequency was transmitted during the period extending from $t - 1/R$ to $t$ where $t$ is the present time. To ease the computational requirements placed on the microprocessor 170, a square-wave approximation to the "mark" frequency replica is used.

Equation 352 specifies the computations required to obtain the inphase cross-correlation $M_i$ of the received signal with the "mark" frequency square-wave replica having a sine wave fundamental. Equation 354 specifies the computations required to obtain the quadrature cross-correlation $M_q$ of the received signal with the "mark" frequency square-wave replica having a cosine wave fundamental. The quantity $m(n)$ in the equations denotes the "mark" frequency received signal sample stored at memory location $n$. The quantity $int(n)$ denotes the integer portion of $n$.

The quantity $M_i$ is an estimate of the relative probability that a "sine-type" square-wave replica was received. The quantity $M_q$ is an estimate of the relative probability that a "cosine-type" square-wave replica was received. Equation 356 specifies the computations required to obtain M, an estimate of the relative probability that a square-wave replica of any phase was received. The factor $f_s$ is for normalizing purposes and will be discussed further in connection with the routine shown in FIG. 7A. The quantity D defined by equation 358 will be discussed in connection with the discussion of FIG. 7A that follows.

Following the computations 350, a determination 359 is made as to whether the "calibrate" flag has been set as a result of the user of the equipment pushing the momentary "calibrate" switch 144 (FIG. 1). If it has been set, the calibrate routine is performed. Otherwise, the operate routine is executed. These two routines will be discussed a little later in connection with FIGS. 8 and 9.

The microprocessor 170 computes the cross-correlations of the received signal with the "space" frequency replicas by means of the routine shown in FIG. 7A. The routine is triggered by the rising transitions of a square-wave clock signal having a frequency equal to the "space" frequency. The computations 360 result in an estimate of the relative probability that a "space" frequency was transmitted during the period extending from $t - 1/R$ to $t$. Just like the "mark" frequency cross-correlations, a square-wave approximation to the "space" frequency replica is used.

The quantities $S_i$, $S_q$, and S defined by equations 362, 364, and 366 respectively correspond to the similarly defined quantities of FIG. 6A with the "space" frequency replica substituted for the "mark" frequency replica. The quantity $s(n)$ denotes the "space" frequency received signal sample stored at memory location $n$. The quantity $S_i$ is an estimate of the relative probability that a "sine-type" square-wave replica having a frequency equal to the "space" frequency was received. The quantity $S_q$ is an estimate of the relative probability that a "cosine-type" square-wave replica was received. The quantity S is an estimate of the relative probability that a square-wave replica of any phase was received.

In those cases where the rising transitions of the "mark" and "space" frequency clocking signals coincide, the routine shown in FIG. 7A is performed first since the computed "S" data is required to perform some of the computations shown in FIG. 6A.

A "mark" frequency cross-correlation involves $4f_m/R$ received signal samples while a "space" frequency cross-correlation involves $4f_s/R$ samples. In order to place the relative probabilities represented by M and S on the same scale, the factors $f_s$ and $f_m$ are incorporated in the equations 356 and 366 of FIGS. 6A and 7A. Both quantities thereby appear to be based on the same number of received signal samples $-4f_mf_s/R$.

A convenient quantity for assessing the probability that a "mark" frequency rather than a "space" frequency was received is $D = M - S$, the frequency-shift-keying (FSK) version of equation 358 in FIG. 6A. If D is greater than zero, the relative probabilities M and S favor the conclusion that the "mark" frequency rather than the "space" frequency was received. If D is less than zero, the relative probabilities favor the opposite conclusion.

The reader 100 can also be configured to read tags that utilize on-off-keying (OOK) or phase-shift-keying (PSK). The "space" frequency interrupt is disabled when tags using these two modulation techniques are being read since the information is carried by a single frequency (which, for convenience, will be referred to as the "mark" frequency). The appropriate expressions for D are labeled "OOK" and "PSK" in equation 358 of FIG. 6A. The quantity L is ideally equal to half the value of M in the absence of noise. The quantities $U_i$ and $U_q$ are respectively the inphase and quadrature components $M_i$ and $M_q$ for some representative bit period. Their use in the equation for D results in a positive D when the signal received during a bit period has the same phase as the signal received during the representative bit period. A negative D results when the signal received during a bit period has the phase opposite to that of the signal received during the representative bit period.

Figure 4B:
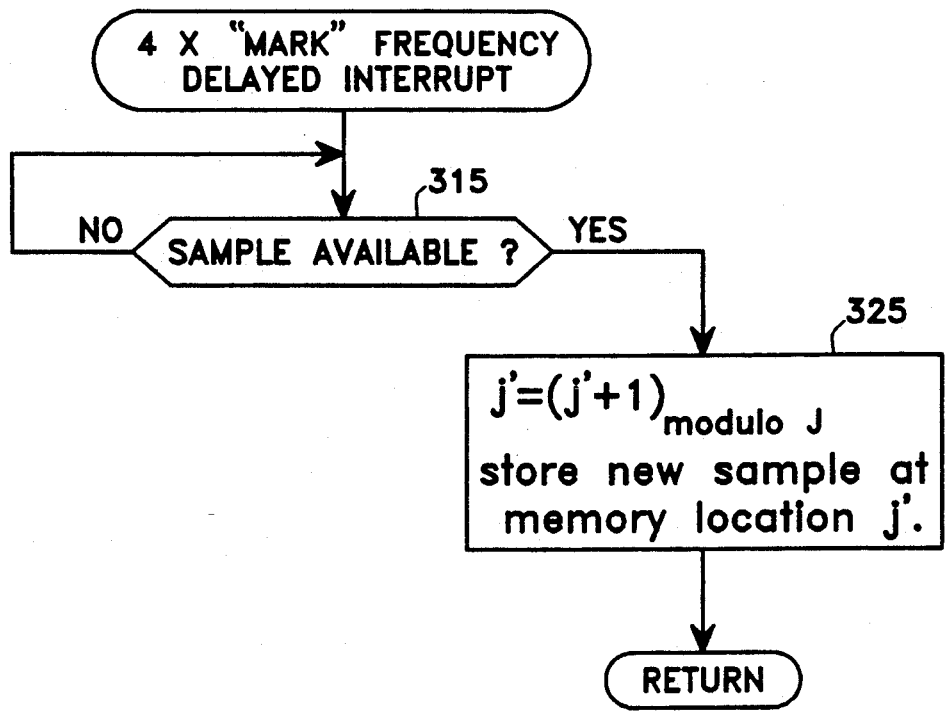
FIG. 4B is the flow diagram of the 4 Times "Mark" Frequency Delayed Interrupt Routine that is performed by the microprocessor in the reader.
Figure 5B:
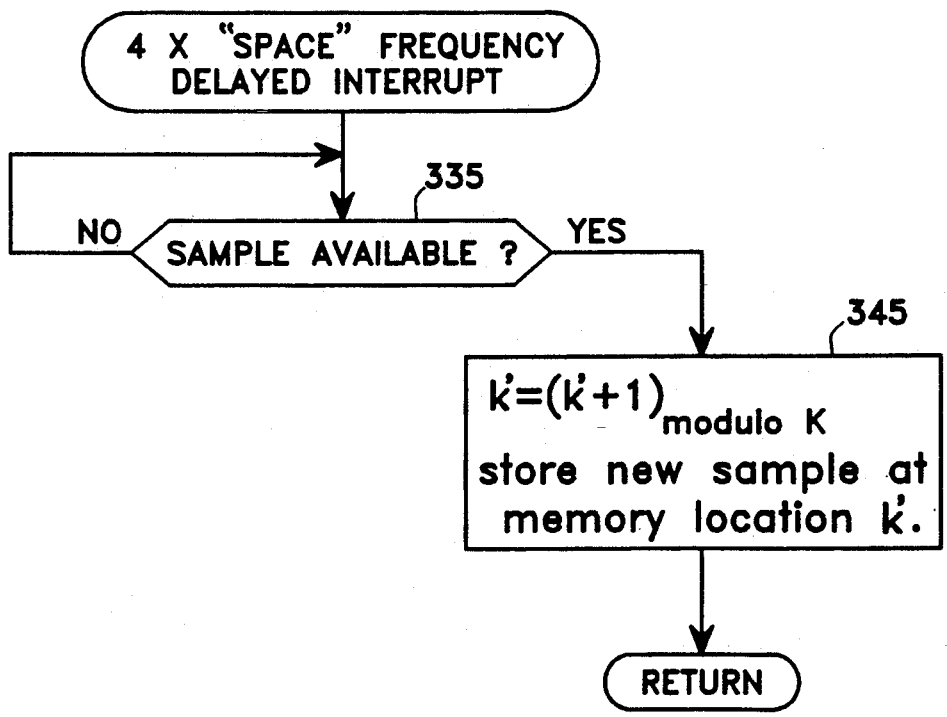
FIG. 5B is the flow diagram of the 4 Times "Space" Frequency Delayed Interrupt Routine that is performed by the microprocessor in the reader.

In the alternative embodiment of the demodulation process (which substitutes a notch filter for the envelope detector 145, lowpass filter 150, and DC canceller of FIG. 1), the received waveform is most conveniently represented by complex-valued samples where each sample value consists of a real part and an imaginary part. The real sample values are obtained as previously described in connection with FIGS. 4A and 5A. The imaginary sample values are obtained by sampling the received waveform one-quarter cycle of the driving frequency after the real sample values are obtained. The imaginary sample values are stored in separate memory spaces as detailed in FIGS. 4B and 5B. The routines shown in FIGS. 4B and 5B are identical to those shown in FIGS. 4A and 5A except that they involve different memory spaces.

The cross-correlation process that is used to extract the information content from the received signal is somewhat more complicated when the received signal and the replicas of the possible received signals are represented by complex values. The quantities of interest are the cross-correlations of the complex signal and the complex conjugates of the replicas.

Figure 6B:
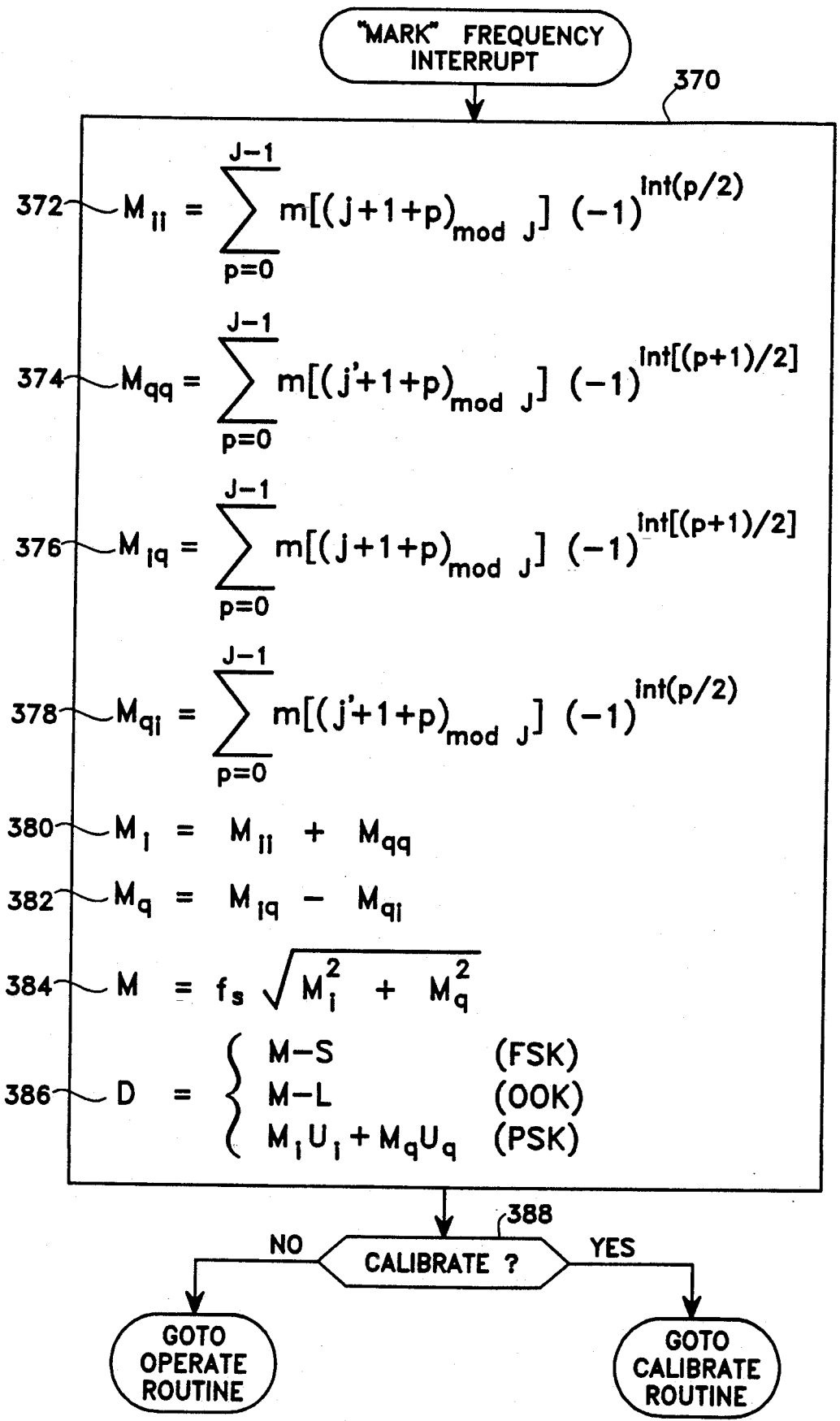
FIG. 6B is the flow diagram of the "Mark" Frequency Interrupt Routine that is performed by the microprocessor in a second embodiment of the reader.

The process is defined in FIG. 6B for a "mark" frequency replica correlation. The computations 370 utilize the data stored in the j and j' memory spaces as a result of the routines shown in FIGS. 4A and 4B.

Equation 372 defines the cross-correlation of the real part of the received signal with the real part of the "mark" frequency square-wave replica. The real part of the "mark" frequency square-wave replica is a square wave having a sine wave fundamental.

Equation 374 defines the cross-correlation of the imaginary part of the received signal with the imaginary part of the "mark" frequency square-wave replica. The imaginary part of the "mark" frequency square-wave replica is a square wave having a cosine fundamental.

Equation 376 defines the cross-correlation of the real part of the received signal with the imaginary part of the "mark" frequency square-wave replica.

Equation 378 defines the cross-correlation of the imaginary part of the received signal with the real part of the "mark" frequency square-wave replica.

Equation 380 defines the real part of the cross-correlation of the complex signal with the complex conjugate of the "mark" frequency square-wave replica.

Equation 382 defines the imaginary part of the cross-correlation of the complex signal with the complex conjugate of the "mark" frequency square-wave replica.

Equations 384 and 386 are the same as equations 356 and 358 respectively of FIG. 6A. The remaining portion of the FIG. 6B routine is the same as the corresponding portion of the FIG. 6A routine.

Figure 7B:
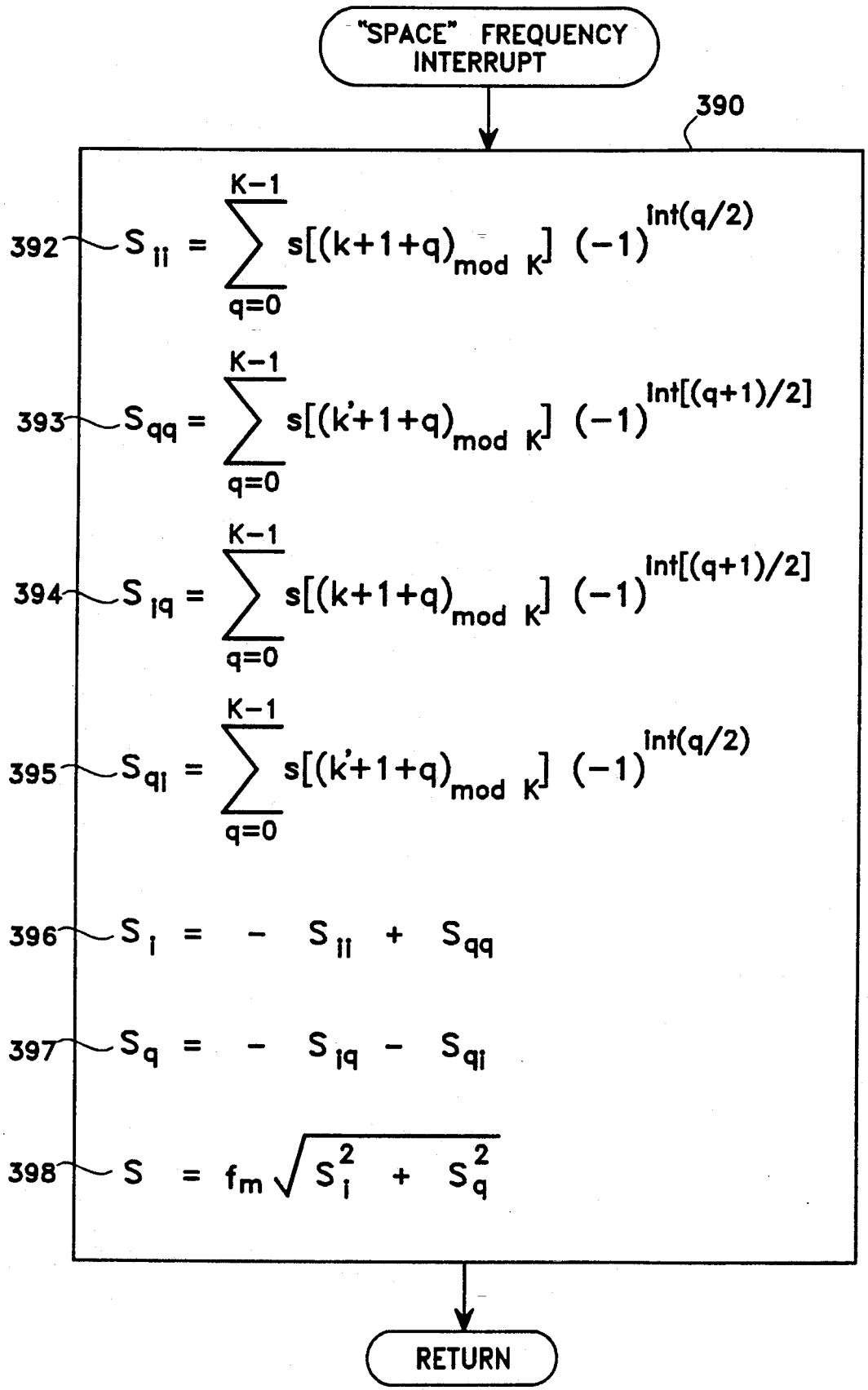
FIG. 7B is the flow diagram of the "Space" Frequency Interrupt Routine that is performed by the microprocessor in a second embodiment of the reader.

The microprocessor 170 computes the complex cross-correlation of the complex received signal with the complex "space" frequency replica in accordance with equations 390 given in FIG. 7B. The computations 390 utilize the data stored in the k and k' memory spaces as a result of the routines shown in FIGS. 5A and 5B.

Equation 392 defines the cross-correlation of the real part of the received signal with the real part of the "space" frequency square-wave replica. The real part of the "space" frequency square-wave replica is a square wave having a sine wave fundamental.

Equation 393 defines the cross-correlation of the imaginary part of the received signal with the imaginary part of the "space" frequency square-wave replica. The imaginary part of the "space" frequency square-wave replica is a square wave having a cosine fundamental.

Equation 394 defines the cross-correlation of the real part of the received signal with the imaginary part of the "space" frequency square-wave replica.

Equation 395 defines the cross-correlation of the imaginary part of the received signal with the real part of the "space" frequency square-wave replica.

Equation 396 defines the real part of the cross-correlation of the complex signal with the complex conjugate of the "space" frequency square-wave replica.

Equation 397 defines the imaginary part of the cross-correlation of the complex signal with the complex conjugate of the "space" frequency square-wave replica.

Equation 398 is the same as equation 366 of FIG. 7A.

Figure 8:
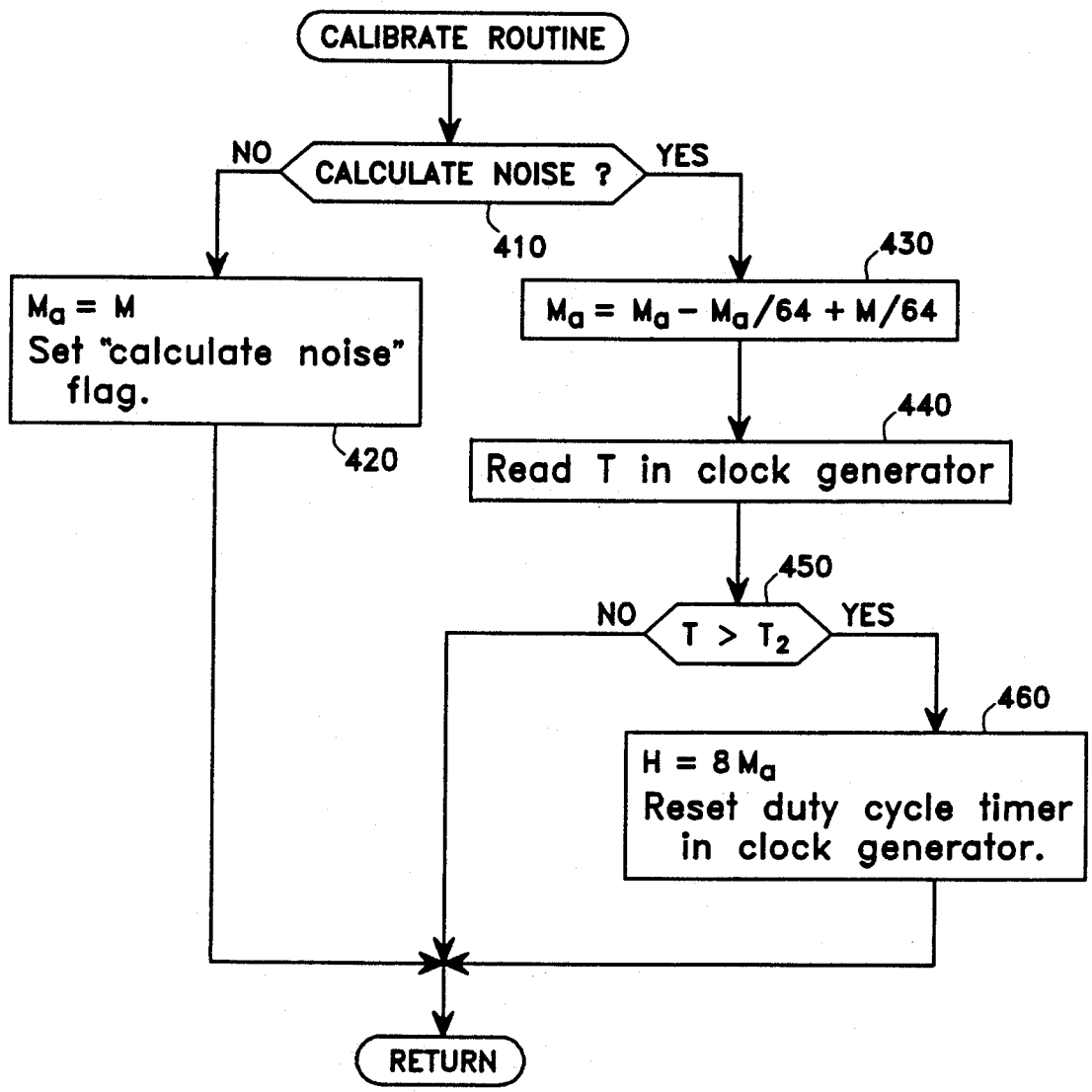
FIG. 8 is the flow diagram of the Calibrate Routine that is performed by the microprocessor in the reader.
Figure 9:
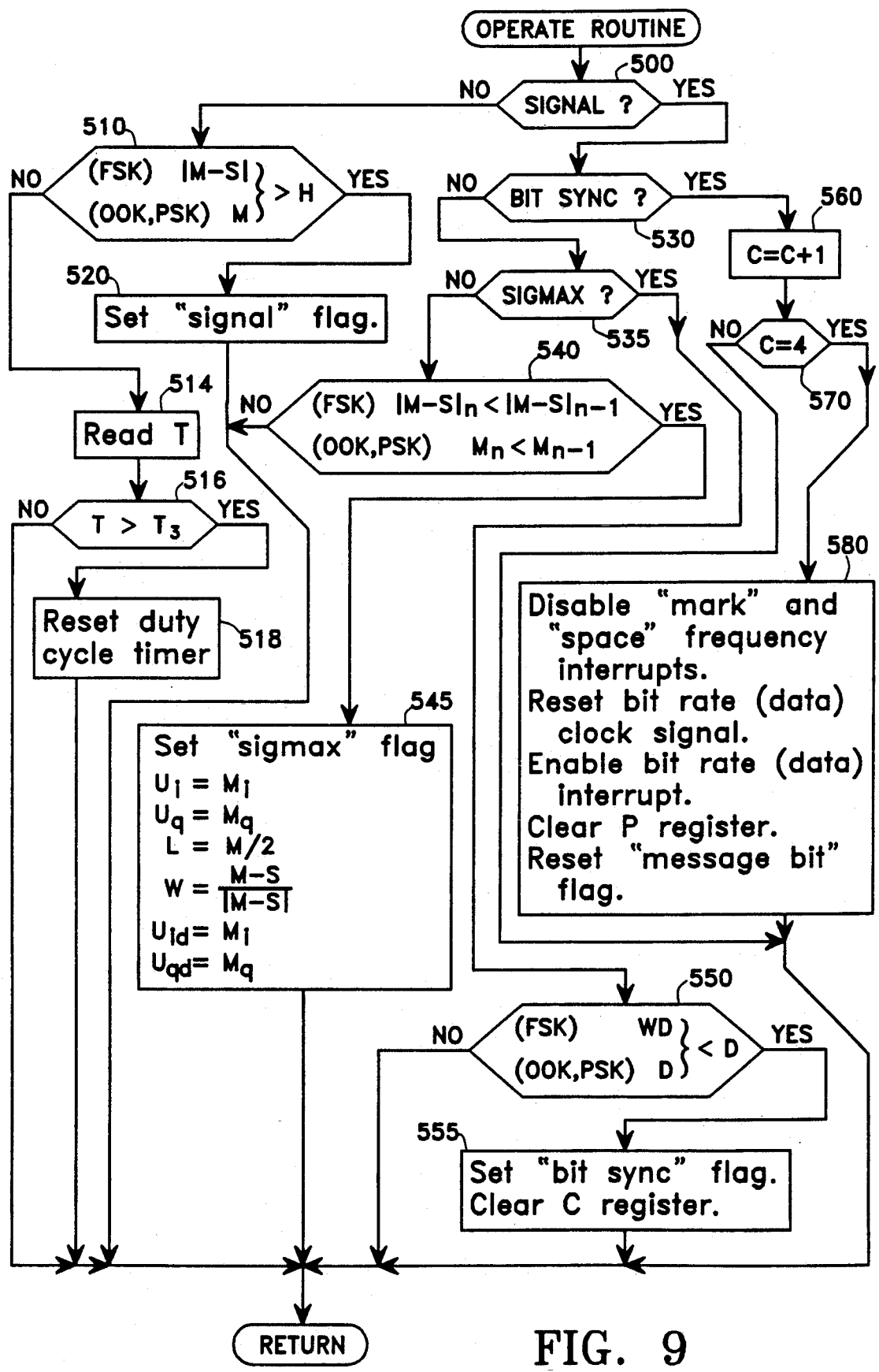
FIG. 9 is the flow diagram of the Operate Routine that is performed by the microprocessor in the reader.

The Calibrate Routine shown in FIG. 8 establishes what the noise threshold of the reader receiving circuitry is and sets an appropriate threshold for deciding whether a signal from the tag is being received. This routine is performed by the microprocessor 170 at the conclusion of the "Mark" Frequency Interrupt Routine if the operator of the equipment has pressed the momentary "calibrate" switch 144 (FIG. 1) thereby causing the microprocessor to set the "calibrate" flag. Normally, the operator would calibrate the equipment each day prior to use or when changing locations of use.

The microprocessor performs test 410 to see if the "calculate noise" flag has been set. This flag is reset when power to the reader 100 is turned on and each time the duty cycle timer is reset. Thus, the first time through the calibrate routine the microprocessor performs operation 420 consisting of entering M into the $M_a$ register and setting the "calculate noise" flag. On subsequent passages through the calibrate routine, the microprocessor performs the operation 430 which after many repetitions results in an $M_a$ that is a smoothed version of M. The factor 64 establishes the time period over which the M data is smoothed and the degree of smoothing. The aim here is to obtain an estimate of the average value of the noise amplitude that is within say 5% of the actual average value.

The microprocessor next performs the operation 440 consisting of reading the time T maintained by the clock generator 140. If the microprocessor finds by test 450 that T is greater than $T_2$, the time required to achieve the desired amount of smoothing, operation 460 is performed. The received signal detection threshold H is set at some multiple of the noise level $M_a$. The factor 8 that appears in the equation for H limits the false signal detections to a reasonably low number while maintaining the probability of detection at a reasonably high value.

The duty cycle timer in the clock generator 140 is then reset which causes all flags to be reset including the "calibrate" flag and the "calculate noise" flag. The "calibrate" flag is reset so as to signal the microprocessor 170 at the next "mark" frequency interrupt that the Operate Routine should be performed (see FIG. 6, operation 359).

The specific numbers shown at 420 and 460 correspond to the particular embodiment of the invention described herein. Other numbers, if chosen with regard to the guidelines given above, could also achieve the purposes of the invention.

To achieve the greatest possible accuracy in extracting the message bits from the received signal, the cross-correlation of received signal and replica must involve signal samples from only one bit period. The Operate Routine shown in FIG. 9 enables the microprocessor 170 to recognize the presence of a tag signal and to synchronize the receiving operations to the bit timing established by the tag.

A "signal" flag denotes the presence of a signal from a tag. The "signal" flag is reset each time the duty cycle timer signal in the clock generator 140 goes low. Thus, the microprocessor 170 in performing the test 500 in FIG. 9 finds that the signal flag is down and performs test 510. If the microprocessor determines by test 500 that the absolute value of M-S (FSK) or M (OOK or PSK) does not exceed the detection threshold H, it concludes that a signal is not present and performs the operation 514 of reading T and the test 516 of comparing T with a predetermined time $T_3$. If T is greater than $T_3$, the search for a tag at the particular location of the reader coil has taken longer than it should if a tag were present at that location and the search is aborted by performing the operation 518. If the test 510 reveals the presence of a signal (and a tag), the operation 520 of setting the "signal" flag is performed.

On the next interrupt after the "signal" flag is set, the microprocessor recognizes by the test 500 that the "signal" flag is set and performs the test 520. The "bit sync" flag was also reset when the duty cycle timer signal went low and the microprocessor proceeds to test 535. The "sigmax" flag was also reset when the duty cycle timer signal went low and the microprocessor proceeds to test 540.

Signal detection is likely to occur when the cross-correlation intervals are not properly aligned with the received bit periods. The correlation of the received signal with the replica(s) should increase with each successive interrupt as the correlation interval moves into alignment with the received bit period and then the correlation should start to decrease as the correlation interval moves out of alignment. The microprocessor, by means of test 540, determines when bit alignment (or bit synchronization) occurs by testing for a decrease in correlation. When the just-measured absolute value of M-S (denoted by the subscript n) is less than the previously-measured value (FSK) (denoted by the subscript n−1) or when the just-measured value of M is less than the previously-measured value (OOK or PSK), the microprocessor proceeds to operation 545 and sets the "sigmax" flag. The constants $U_i$, $U_q$, and L (see FIG. 6, equation 358) are given values and the quantity W is calculated. The quantities $U_{id}$ and $U_{qd}$ are given initial values.

At the next "mark" frequency interrupt, the microprocessor passes through test 500, 530, and 535 and arrives at operation 550. For an FSK signal the quantity WD will be positive. For either an OOK or PSK signal, the quantity D will be positive. As the operation is repeated during future traversals through this interrupt routine, the quantities will eventually go negative. The interrupt when this occurs marks the timing situation when the cross-correlation periods include half of one bit and half of the following bit. This occurrence is marked by performing the operation 555 of setting the "bit sync" flag. The C register is also cleared for reasons that will become obvious when operation 560 and subsequent operations are discussed.

At the next "mark" frequency interrupt, the microprocessor passes through tests 500 and 530 and performs the operation 560 of incrementing the C register which was cleared when operation 555 was performed. The microprocessor then performs the operation 570 of testing the value of C.

Figure 10:
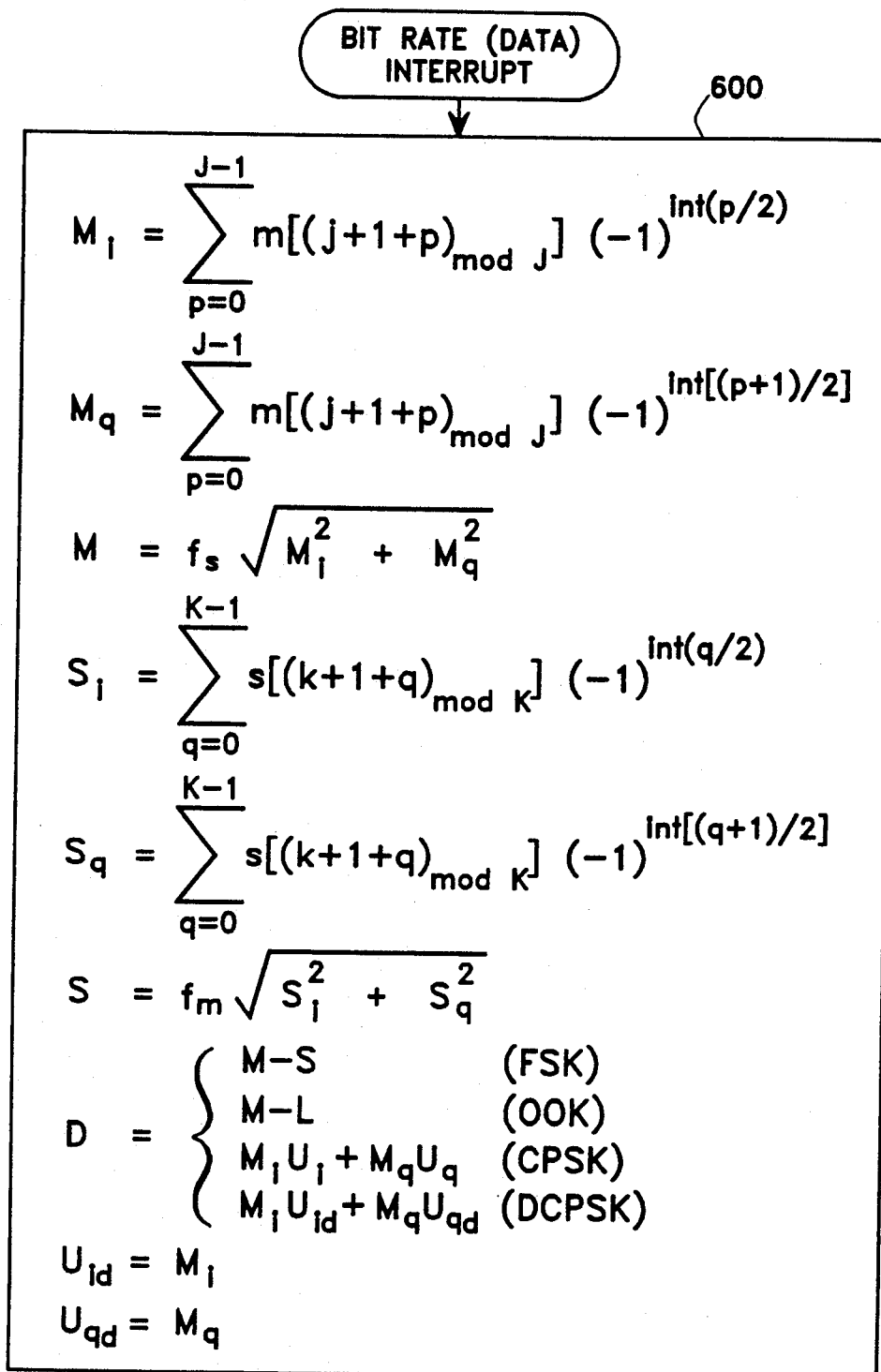
FIG. 10 is the flow diagram of the Bit Rate (Data) Interrupt Routine that is performed by the microprocessor in the reader.
Figure 10:
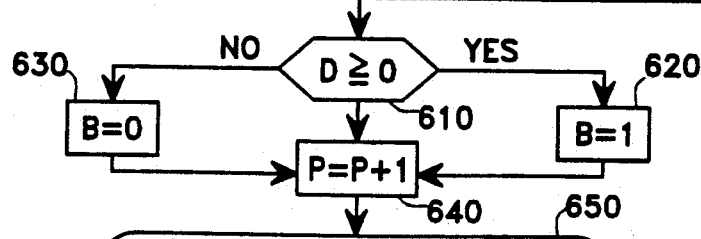
Figure 11:
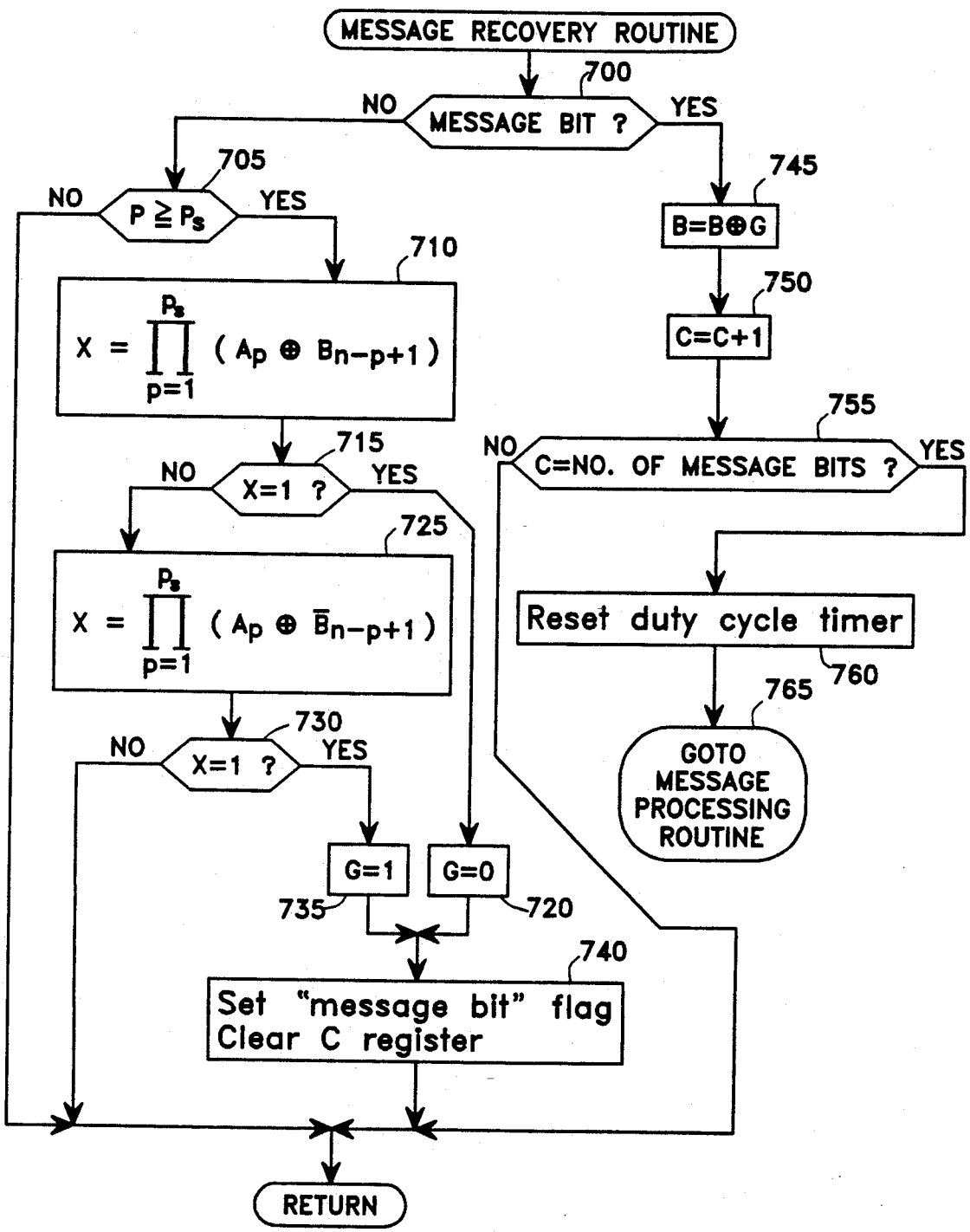
FIG. 11 is the flow diagram of the Message Recovery Routine that is performed by the microprocessor in the reader.

The "bit sync" flag was set when the cross-correlation intervals were extending approximately from the middle of one bit period to the middle of the next. The cross-correlation intervals advance by 0.02 ms with each "mark" frequency interrupt ("mark" frequency=50 kHz). After 5 interrupts the cross-correlation intervals will have advanced by one-half of a bit period and will be approximately aligned with the bit periods. Thus, when C reaches 4, the next "mark" frequency interrupt will mark the time when substantially all of the accumulated signal samples correspond to one bit period. The microprocessor then performs operation 580 consisting of disabling the "mark" and "space" frequency interrupts, resetting the bit rate (data) clock signal in the clock 140 so that its next positive transition will coincide with the next positive transition of the "mark" frequency clock signal, and enabling the bit rate (data) interrupt. The P register, which is used in the Bit Rate (Data) Interrupt Routine shown in FIG. 10, is cleared. The "message bit" flag used in the Message Recovery Routine shown in FIG. 11 is reset. The reader is now ready to read out the data transmitted by the tag.

The bit identification process corresponding to the reader configuration shown in FIG. 1 is shown in FIG. 10. It is triggered by an interrupt generated by the bit rate (data) clock signal that was previously synchronized to the incoming signal. The required computations 600 are the same as the computations 350 and 360 discussed previously in connection with FIGS. 6 and 7 except that the quantities $U_{id}$ and $U_{qd}$, the previously-measured $M_i$ and $M_q$, provide the phase reference in obtaining D for differentially-coherent phase-shift-keying (DPSK).

If the microprocessor determines by test 610 that D is greater than or equal to zero, it performs the operation 620 identifying the received bit B as a "1". If the microprocessor finds that D is less than zero, it identifies the bit as a "0". All received bits are saved in memory for subsequent processing.

The operation 640 increments the P register thereby maintaining a count of the number of bits received after bit synchronization occurred.

The final operation 650 causes the microprocessor to go to the Message Recovery Routine shown in FIG. 11.

The bit identification process corresponding to the embodiment of the reader that substitutes a notch filter for the envelope detector 145, the lowpass filter 150, and the DC canceller 155 is the process shown in FIG. 10 and discussed above except that the equations of FIGS. 6B and 7B are used instead of those of FIGS. 6A and 7A.

Recovery of the message proceeds according to the flow diagram shown in FIG. 11. The microprocessor 170 first performs test 700 and since the "message bit" flag was reset in operation 580 of the Operate Routine shown in FIG. 9, it proceeds to test 705 to see if the number of bits accumulated is sufficient for processing. The number of bits required to establish the start of a message is denoted by the symbol $P_s$. If the count P equals $P_s$, the operation 710 is performed which establishes whether the $P_s$ bits thus far accumulated constitute a "start message" code. The symbols used in the equation of operation 710 have the following meanings. The sequence of "0's" and "1's" that constitutes the "start message" code and precedes the first message bit is represented (in reverse order of transmission) by $A_p$ where p takes on the values from 1 to $P_s$. The most recently acquired bit is denoted by $B_n$. The bit acquired m bit periods previously is denoted by $B_{n-m}$. The plus signs denote modulo 2 additions. The product sign indicates that the quantities in parentheses are to be AND'ed together. If X equals 1, the bits thus far accumulated constitute the "start message" code. The quantity G is set equal to 0 during operation 720 signifying that the received bits have been properly recognized as "0's" and "1's".

If X does not equal 1, it may be because the "0's" and "1's" in the received bit sequence have been interchanged (since there may be a phase ambiguity of $\pi$ radians). To check this possibility, operation 725 is performed which is the same as operation 710 except that the received bits are inverted, as denoted by the bars over the $B_{n-m}$. Test 730 is performed on the new X and if it is equal to 1, the "start message" code has been received but the received bits are inverted. The operation 735 of setting G equal to 1 is performed signifying that the received bits are inverted. If either of the tests 715 and 730 are successful, the operation 740 is performed which sets the "message bit" flag and clears the C register.

If neither of the tests 715 and 730 are successful, the interrupt routine ends. During the next interrupt, the oldest bit is discarded, the new bit is added, and the same tests are repeated. This process continues, interrupt by interrupt until the "start message" code is recognized. If the start message is not recognized within a predetermined time period following detection of a signal, the reader magnetic field may be turned off to save battery energy.

Interrupts subsequent to the recognition of the "start message" code proceed through test 700 to operation 745 where incorrect inversions of the data are corrected by adding modulo 2 the quantities B and G. The received message bits are counted in operation 750 by incrementing the C register. When test 755 shows that the proper number of message bits have been received, the duty cycle timer is reset by operation 760 thereby removing the voltage from the reader coil 110. The microprocessor is then instructed in operation 765 to go to the Message Processing Routine shown in FIG. 12.

The reader 100 may be instructed to look for one type of tag or for a variety of tags by means of "mode" data stored in read-only memory in the form of an integrated circuit, a resistor matrix, or any other means for permanently storing binary data. Mode data include driving frequency, type of modulation (i.e. FSK, OOK, CPSK, and DCPSK), "mark" and "space" frequencies, bit rate, data encoding if any (e.g. Manchester or related coding techniques), "start message" code, error detection process (e.g. cyclic redundancy checks, parity checks), tag type, and all of the constants that are incorporated into the firmware that controls the operations of the reader.

Figure 12:
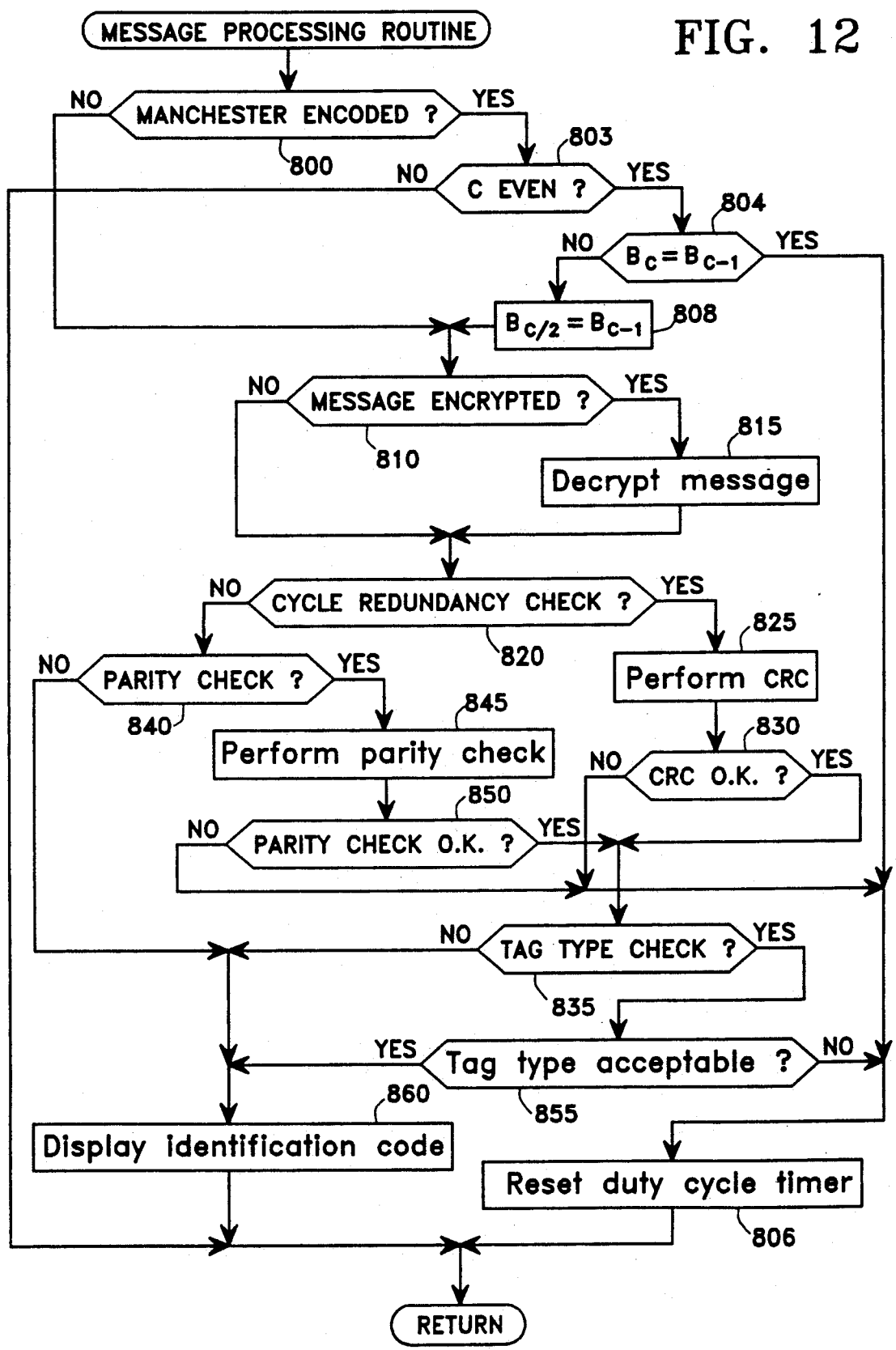
FIG. 12 is the flow diagram of the Message Processing Routine that is performed by the microprocessor in the reader.

The Message Processing Routine shown in FIG. 12 is of rather limited scope simply because the variety of tags presently in use is rather limited. As new and improved tag designs make their appearance, the firmware as represented by this flow diagram can be expanded or modified to include these new and unique features as they make their appearance. Thus, this flow diagram should be recognized as exemplary of the possibilities rather than a full and complete exposition of the capabilities of the invention.

The microprocessor 170 performs test 800 by determining from the mode data whether the data is Manchester encoded. If it is, test 803 is performed. If the number of message bits received C is even, the just-received bit $B_C$ is compared with the previously-received bit $B_{C-1}$ in operation 804. In Manchester coding, the two bits have to be different. If they are the same, an error in transmission has occurred and the current "read" cycle is terminated by the operation 806 of resetting the duty cycle timer in the clock generator 140. If the bits are not the same, operation 808 is performed designating the (C-1)'th bit as the C/2'th bit of the message.

Test 810 is accomplished by determining from the mode data whether the message is encrypted. If it is, the mode data contains the information necessary to decrypt the message during operation 815. Mode data will also indicate for the purposes of tests 820 and 840 whether either cyclic redundancy checks or parity checks are to be made. The required data for making these checks during operations 825 and 845 is also provided in the mode data.

If the cyclic redundancy check or the parity check is incorrect, test 830 or test 850 respectively causes the current "read" cycle to end by operation 806. If the checks are satisfactory, the microprocessor proceeds to test 835 and determines by consulting the mode data whether the tag type is included in the message. If it is, the determination is made in test 855 as to whether the tag type is among those authorized to be read. If it is not, the present "read" cycle is aborted through operation 806. In another embodiment, the reader would be optionally empowered to display an "unauthorized tag detected" message.

The final operation of the routine is 860 which results in the display of the identification code for the tag on the liquid crystal display 175. Two "beeps" of a tone are also caused to issue from the speaker 185.

Figure 13:
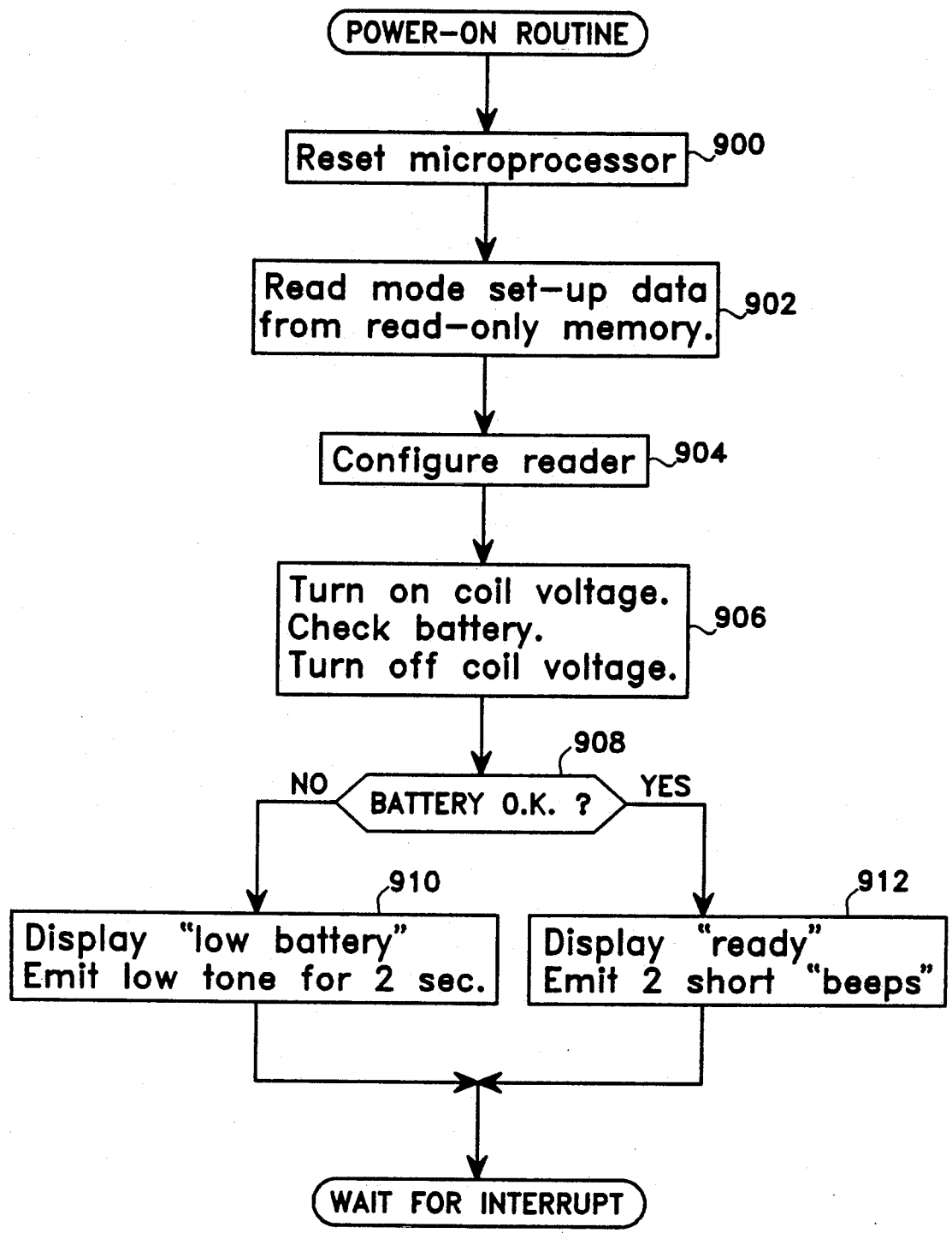
FIG. 13 is the flow diagram of the Power-On Routine that is performed by the microprocessor in the reader.

The routine executed by the microprocessor when the reader power switch is actuated by the user is shown in FIG. 13. Operation 900 resets the microprocessor 170 and causes it to perform an initialization procedure. The microprocessor, during operation 902, obtains all necessary mode data from the mode data read-only memory necessary to configure the reader 170 to read the tags it is authorized to read. The reader 170 is configured during operation 904.

The coil 110 is energized during operation 906 and the battery voltage is compared under load with a reference voltage. After the comparison is made, the coil voltage is turned off. If the voltage level is found to be low during test 908, operation 910 causes a "low voltage" message is displayed on liquid crystal display 175 and a low audible tone is caused to be emitted by the speaker 185 for one second. If the voltage level is acceptable, the operation 912 causes the message "ready" to be displayed and two short "beeps" to be emitted. The microprocessor then enters a dormant stage where it waits for interrupts that cause it to perform additional processing operations.

The $T_1$ Interrupt Routine is shown in FIG. 14. The $T_1$ interrupt is produced by the T counter in the clock generator 140 when the coil voltage has reached a near steady-state condition after having been turned on. Operation 920 results in the opening of switch 160 in the DC canceller 155. The bit rate (control) interrupt is enabled by operation 924 thereby permitting the actual "read" process to begin.

The Bit Rate (Control) Interrupt Routine is shown in FIG. 15. Test 930 reveals that the "start correlations" flag has not been set and operation 932 consisting of enabling the 4 times "mark" frequency and the 4 times "space" frequency interrupts and setting the "start correlations" flag. At the next bit rate (control) interrupt, the microprocessor proceeds through test 930 to operation 934 and thereby enables the "mark" frequency and the "space" frequency interrupts, the latter only if the mode data indicates that the responding tag utilizes FSK modulation. The "start correlations" flag is reset in anticipation of the next "read" cycle and the bit rate (control) interrupt is inhibited.

The Coil-Off Interrupt Routine is shown in FIG. 16. The coil-off interrupt is generated when the signal from the duty cycle timer in the clock generator 140 goes low and turns off the coil voltage. When this interrupt occurs, the microprocessor inhibits all interrupts, resets all flags, clears all registers, and closes switch 160.

The use of the multi-mode identification system begins with the selection of a particular physical design for the tags that are suitable for attachment to or implantation in the objects of interest. Tags are manufactured in the number required and a sequence of bits including a unique identification code is programmed into the non-volatile memory of each tag. The tags are attached to or implanted in the objects of interest as the need arises.

The identification process consists of switching on the power to the reader, optionally calibrating the instrument in terms of noise level by pressing the "calibrate" switch and pulling the "read" trigger. The device is now ready to read tags.

The user pulls the "read" trigger and moves the reader over the surface of the object near where the tag, if present, would reside. If a tag is present and the tag is of the type authorized to be read, the identification code associated with the object is displayed and audibly indicated.

The description of the preferred embodiment of the multi-mode identification system reflects the choice of particular design options and design parameter values. It will be evident to one skilled in the art that other choices are possible and may even be desirable for certain applications and will similarly permit the achievement of the purposes of the invention. It is intended that the invention be limited only by the claims and not by the more limited concept represented by the preferred embodiment.

What is claimed is:

1. An electronic identification tag for use with an identification reader, said reader interrogating said tag by generating a reversing magnetic field, said tag comprising:

a means for storing information to be communicated to an electronic identification reader;

a means for varying the absorption of power from said reversing magnetic field in accordance with said stored information, the generation of said magnetic field being started at some arbitrary time, said magnetic field being zero prior to said arbitrary time and consisting of a steady-state component and a transient component subsequent to said arbitrary time;

a means for delaying said variation in absorption of power for a predetermined period of time, said delay time being the time required for said transient associated with starting the generation of said reversing magnetic field to decrease to a level where said varying absorption of power from said reversing magnetic field is distinguishable from said transient.

2. The identification tag of claim 1 further comprising:

a means for extracting power from said reversing magnetic field, said power being used by said tag in performing its function.

3. The identification tag of claim 2 wherein said stored information is binary data, each bit of said binary data causing the absorption of power from said reversing magnetic field to vary according to a first function when said bit is a "0" and according to a second function when said bit is a "1".

4. The identification tag of claim 2 wherein said stored information is binary data, each bit of said binary data causing the absorption of power from said reversing magnetic field to vary according to a first periodic function when said bit is a "0" and according to a second periodic function when said bit is a "1", the values of said first periodic function for any half-period separations in time being equal in magnitude and opposite in sign, the values of said second periodic function for any half-period separations in time being equal in magnitude and opposite in sign, the durations of said first and second periodic functions being equal to a bit period.

5. The identification tag of claim 4 wherein said bit period is a multiple of the periods of said first and second functions and said first and second function periods are multiples of the period of said reversing magnetic field, the beginning of said bit period coinciding with some one of said first function periods, some one of said second function periods, and the reversing magnetic field period first occurring after said delay time.

6. The identification tag of claim 2 further comprising at least one environmental sensor, said sensor providing information related to the environment in which said tag is located, variation of absorbed power by said power absorbing means being in accordance with information supplied by said information storage means and with information supplied by said sensor.

7. The identification tag of claim 2 or claim 6 wherein said power extraction means supplies power in the form of a DC voltage and said delay means comprises a threshold detector and a timing device, said threshold detector producing a signal when said voltage exceeds a threshold level, said timing device producing a signal at a predetermined time after said threshold detector signal occurs.

8. The identification tag of claims 2 or 6 wherein said power extraction means comprises a coil and a capacitor in parallel and an AC-to-DC converter, said coil and a capacitor being resonant at the frequency of said reversing magnetic field, the AC input voltage to said converter being the voltage appearing across said coil and capacitor, the output from said converter being said DC voltage.

9. The identification tag of claim 8 wherein said power absorption means comprises a resistive load connected across said coil and capacitor and a signal generator, said signal generator producing an extended signal as a function of time when said delaying means permits said variation in absorption of power from the reversing magnetic field to occur, said extended signal being functionally related to information supplied by said information storage means, said extended signal controlling the resistance of said resistive load.

10. An electronic identification tag having information to be communicated to an electronic identification reader, said reader interrogating said tag by generating a reversing magnetic field, said tag comprising a coil, a capacitor, a variable load, an AC-to-DC voltage converter, a delay means, a signal generator, a first connecting means, a second connecting means, a third connecting means, a fourth connecting means, and a fifth connecting means; said coil and capacitor having first and second connecting terminals, said variable load, voltage converter, and delay means having first, second, and third connecting terminals, and said signal generator having first, second, third, and fourth connecting terminals; first terminals of all said devices being connected together by said first connecting means, said second terminals of said coil, capacitor, variable load, and voltage converter being connected together by said second connecting means, said third terminal of said voltage converter being connected to said second terminals of said delay means and said signal generator by said third connecting means, said third terminal of delay means being connected to said third terminal of said signal generator by said fourth connecting means, and said fourth terminal of said signal generator being connected to said third terminal of said variable load by said fifth connecting means; said coil and capacitor being resonant at a predetermined frequency, said coil producing an AC voltage across its terminals in response to said reversing magnetic field encircled by said coil, said voltage converter producing a DC voltage at its third terminal in response to said AC voltage impressed across its first and second terminals by said first and second connecting means, said DC voltage being impressed across the first and second terminals of said delay means and the first and second terminals of said signal generator by said first and third connecting means, said DC voltage causing said delay means to provide a "start" signal after a predetermined delay to the first and third terminals of said signal generator by said first and fourth connecting means, said DC voltage in conjunction with said "start" signal causing said signal generator to supply a signal to the first and third terminals of said variable load by said first and fifth connecting means, said signal generator signal being uniquely related to said tag information stored within said signal generator, the magnitude of said variable load being varied in accordance with the magnitude of said signal supplied by said signal generator, the absorption of power by said variable load from said reversing magnetic field being in proportion to said magnitude of said variable load.

11. The identification tag of claim 10 further comprising at least one environmental sensor, the information produced by said sensor being part of said tag information and being supplied to said signal generator.

12. The identification tag of claims 10 or 11 wherein said devices comprising said tag with the exception of said coil and capacitor are packaged in the form of integrated circuitry on a substrate, said substrate also serving as a platform for mounting said capacitor and said coil.

13. The identification tag of claims 10 or 11 wherein said devices comprising said tag with the exception of said coil and capacitor are packaged in the form of integrated circuitry on a substrate, said capacitor being in the form of a chip, said integrated circuitry substrate being mounted on said capacitor chip, said coil being attached to said capacitor chip.

14. The identification tag of claims 10 or 11 wherein all of said devices comprising said tag with the exception of said coil and capacitor are packaged in the form of integrated circuitry on a substrate, said capacitor also being incorporated in said substrate by means of integrated circuit processing techniques, said substrate also serving as a platform for mounting said coil.

15. The identification tag of claims 10 or 11 wherein all of said devices comprising said tag with the exception of said coil and capacitor are packaged in the form of integrated circuitry on a substrate, said coil and said capacitor also being incorporated in said substrate by means of integrated circuit processing techniques.

16. An electronic identification reader for use with an electronic identification tag that absorbs power from a reversing magnetic field in accordance with information to be communicated to said reader, said reader operating in at least one of a plurality of modes, said modes being characterized by mode control data, said reader comprising:
  a means for storing mode control data;
  a means for generating a reversing magnetic field;
  a means for starting said generating means;
  a means for stopping said generating means;
  a means for obtaining a measure of the time-dependent absorption of power from said magnetic field by an electronic identification tag, said power absorption measure representing information being communicated by said tag; and
  a means for extracting said information from said power absorption measure, said information extracting means operating in at least one of a plurality of information extracting modes, each of said information extracting modes defining a specific functional relationship between said information and said time-dependent absorption of power by said tag, said information extracting modes being characterized by said mode control data, the specification of the information extracting mode in said mode control data permitting the extraction of information from said time-dependent absorption of power by said tag.

17. The identification reader of claim 16 wherein said means for generating a reversing magnetic field includes generating said magnetic field at any one of a plurality of frequencies, said magnetic field frequency being specified in said mode control data.

18. The identification reader of claim 16 further comprising a means for mode control, said mode control means causing said information extracting means to operate in at least one of said plurality of said modes in accordance with said mode control data.

19. The identification reader of claim 18 wherein said means for mode control is at least one switch.

20. The identification reader of claim 18 wherein said means for mode control is a plug-in memory device.

21. The identification reader of claim 18 wherein said means for mode control is a reprogrammable memory device.

22. The identification reader of claim 17 further comprising a means for mode control, said mode control means causing said reversing magnetic field to be generated at a particular frequency and causing said information extracting means to operate in at least one of said plurality of said information extracting modes in accordance with said mode control data.

23. The identification reader of claims 18 or 22 wherein said mode control means causes said information extracting means to operate simultaneously in a plurality of said information extracting modes.

24. The identification reader of claims 18 or 22 wherein said mode control means causes said information extracting means to operate sequentially in a plurality of said information extracting modes.

25. The identification reader of claim 18 further comprising means for processing information wherein said extracted information is transformed into processed information in accordance with a functional relationship between said processed information and said extracted information, said functional relationship being one of a plurality of functional relationships, said plurality of functional relationships including one for which said processed information is identical to said extracted information, each of said operating modes also involving one of said plurality of functional relationships.

26. The identification reader of claim 25 wherein said extracted and processed information is binary data, each pair of bits of said extracted information being transformed into a single bit of said processed information, "01" and "10" pairs being transformed into "0" and "1" respectively.

27. The identification reader of claim 25 wherein said extracted and processed information is binary data, each bit of said extracted information after the first bit being transformed into a bit of said processed information, said processed bit being a "0" if said extracted bit and the prior extracted bit are the same, said processed bit being a "1" if said extracted bit and the prior extracted bit are different.

28. The identification reader of claim 25 further comprising a means for reconstituting said processed information in accordance with a functional relationship between said reconstituted information and said processed information, said functional relationship being one of a plurality of functional relationships, said plurality of functional relationships including an identity relationship for which said reconstituted information is identical to said processed information, said plurality of functional relationships also including a plurality of error-correcting functional relationships, said reconstituted information for each of said plurality of error-correcting functional relationships being an error-free version of said processed data, each of said information extracting modes also based on one of said plurality of functional relationships.

29. The identification reader of claim 25 further comprising a means for detecting errors in said processed information in accordance with a functional relationship among the pieces of information, said error-detecting functional relationship causing an error flag to be raised when at least one error in the processed information is detected, said functional relationship being one of a plurality of error-detecting functional relationships, each of said information extracting modes also based on one of said plurality of error-detecting functional relationships.

30. The identification reader of claims 28 or 29 further comprising a means for decrypting an encrypted portion of the tag information in accordance with a functional relationship between said encrypted information and said decrypted information, said decrypting functional relationship being one of a plurality of decrypting functional relationships, each of said information extracting modes also based on one of said plurality of decrypting functional relationships.

31. The identification reader of claim 30 further comprising a means for correcting errors in said decrypted information to obtain error-corrected information in accordance with a functional relationship between said error-corrected information and said decrypted information, said functional relationship being one of a plurality of functional relationships, each of said information extracting modes also based on one of said plurality of functional relationships.

32. The identification reader of claim 25 further comprising a means for displaying said information.

33. The identification reader of claim 32 wherein said display means has an enabling control and said tag information includes the tag class, said display means being enabled if said tag class is included in said mode control data.

34. The identification reader of claim 16 wherein said generating means comprises a first capacitor, a coil, and a second capacitor connected in series in the same sequence, said capacitors being equal in capacitance, said series combination being resonant at a predetermined frequency.

35. The identification reader of claim 17 wherein said generating means comprises a plurality of capacitor pairs, a connecting means, and a coil, any one of said plurality of capacitor pairs being selectable for connection by said connecting means to said coil, the capacitors comprising each of said pairs being equal in capacitance, the capacitors selected for connection being connected one at each end in series with said coil, each of said capacitor pairs in series with said coil having a different resonant frequency.

36. The identification reader of claims 34 or 35 wherein said generating means further comprises first and second drivers, said drivers supplying signals to ends of said series combination of the same form and frequency but of opposite phase thereby causing said series combination to be driven in push-pull, said frequency being the resonant frequency of the series combination.

37. The identification reader of claims 34 or 35 wherein said means of obtaining a measure of absorption of power comprises an envelope detecting device, the input signal to said envelope detecting device being the alternating voltage appearing across said coil, the output signal of said envelope detecting device being the amplitude of said alternating coil voltage.

38. The identification reader of claim 37 wherein said envelope detecting device comprises a full-wave rectifier and a filter, said full-wave rectifier being connected across said coil, the output of said full-wave rectifier feeding into said filter, the bandwidth of said filter being chosen to maximize the signal-to-noise ratio, the variable portion of the output of said filter being the envelope of said alternating coil voltage and a measure of the power absorption from the field of said coil.

39. The identification reader of claim 37 wherein said means for obtaining a power absorption measure further comprises a DC cancelling circuit, the signal from said envelope detecting device feeding into said DC cancelling circuit, the output signal from said DC cancelling circuit being the envelope detecting device output signal diminished by the envelope detecting device output signal at some predetermined time after the beginning of the generation of said reversing magnetic field.

40. The identification reader of claim 39 wherein the DC cancelling circuit has an input terminal, an output terminal, and a common input/output terminal, said DC cancelling circuit comprising a capacitor having first and second terminals, a single-pole/single-throw switch having first and second terminals, a connecting means, and a switch control means, the second terminal of said capacitor being connected by said connecting means to the first terminal of said switch, the first terminal of said capacitor being the input terminal of said DC cancelling circuit, the second terminal of said capacitor being the output terminal of said DC cancelling circuit, the second terminal of said switch being the common input/output terminal of said DC cancelling circuit, said switch control means closing said switch at the beginning of the generation of said reversing magnetic field and opening said switch at said predetermined time after the beginning of the generation of said reversing magnetic field.

41. The identification reader of claim 16 wherein said information extracting means comprises an analog-todigital converter and a digital processor, the function of said analog-to-digital converter being to obtain amplitude samples of said power absorption measure at discrete intervals of time and to provide digital representations of said amplitude samples to said digital processor, the function of said digital processor being to extract from said digital representations said information being communicated by a tag.

42. The identification reader of claim 16 wherein the information being communicated by said tag is binary data, each bit of said binary data causing the absorption of power by said tag from said reversing magnetic field to vary according to a first function or a second function of finite duration, different tags utilizing either the same or different first and second function pairs.

43. The identification reader of claim 16 wherein the information being communicated by a tag is binary data, each bit of said binary data causing the absorption of power from said reversing magnetic field to vary according to a first periodic function or a second periodic function, the duration of said first and second periodic functions being a bit period, the values of said first periodic function at half-period intervals being equal in magnitude and opposite in sign, the values of said second periodic function at half-period intervals being equal in magnitude and opposite in sign, said function pair being either the same or different for different tags, all of said bit periods having the same duration.

44. The identification reader of claim 43 wherein said information is being communicated by a first tag, a second tag, a third tag, a fourth tag, and a fifth tag, the first and second function pairs for said first tag being those associated with on-off keying, the first and second function pairs for said second tag being those associated with coherent phase-shift keying, the first and second function pairs for said third tag being those associated with differentially-coherent phase-shift keying, the first and second function pairs for said fourth tag being those associated with coherent frequency-shift keying, the first and second function pairs for said fifth tag being those associated with non-coherent frequency-shift keying.

45. The identification reader of claim 16 wherein the process performed by said information extracting means proceeds sequentially in a plurality of stages, the extraction of information requiring the successful completion of all of said process stages, the successful completion of each of said process stages occurring within a predetermined time period after said magnetic field generation starts, said information extracting means producing a "fail" signal whenever any one of a preselected group of said process stages is not successfully completed within the predetermined time period corresponding to that process stage, said magnetic field generation starting means is activated by a user of said reader, and said magnetic field generation stopping means is activated when either a "fail" signal occurs or extraction of information is completed.

46. The identification reader of claim 42 wherein said information extracting means comprises a means for recognizing power absorption by a tag, said power absorption recognition process being the first of a plurality of stages comprising the information extraction process.

47. The identification reader of claim 46 wherein said information extracting means further comprises a bit synchronizing means for identifying the beginnings of bit periods, the bit synchronizing process being the second of said plurality of stages comprising the information extraction process.

48. The identification reader of claim 47 wherein said information extracting means further comprises a means for determining which of said first and second functions most closely resembles said power absorption measure over a bit period, the function determining process being the third of said plurality of stages comprising the information extraction process.

49. The identification reader of claim 43 wherein said information extracting means comprises a means for recognizing power absorption by a tag, said power absorption recognition process being the first of a plurality of stages comprising the information extraction process.

50. The identification reader of claim 49 wherein said power absorption recognition means comprises a plurality of function-pair means, each of said function-pair means comprising four replica generators, four correlators, and a calculating device, the functions of said replica generators being to generate inphase and quadrature replicas, said inphase replicas being replicas of said first and second periodic functions, said quadrature replicas being replicas of said first and second periodic functions delayed by one-quarter periods, the function of said correlators being to multiply said power absorption measure by each of said replicas and to integrate the results over a correlation interval, said correlation interval extending from the present to one bit period in the past, thereby obtaining inphase and quadrature replica correlations with said power absorption measure for said first and second periodic functions, said correlations being repeated at intervals no greater than one-half period, the function of said calculating device being to determine from said inphase and quadrature replica correlations when power absorption by a tag is occurring.

51. The identification reader of claim 43 wherein said information extracting means comprises a means for recognizing power absorption by a tag and a bit synchronizing means for identifying the beginnings of bit periods, said power absorption recognition process being the first of a plurality of stages comprising the information extraction process, said bit synchronizing process being the second of said stages comprising the information extraction process.

52. The identification reader of claim 51 wherein said bit synchronizing means comprises a plurality of function-pair means, each of said function-pair means comprising four replica generators, four correlators, and a calculating device, the functions of said replica generators being to generate inphase and quadrature replicas, said inphase replicas being replicas of said first and second periodic functions, said quadrature replicas being replicas of said first and second periodic functions delayed by one-quarter periods, the function of said correlators being to multiply said power absorption measure by each of said replicas and to integrate the results over a correlation interval, said correlation interval extending from the present to one bit period in the past, thereby obtaining inphase and quadrature replica correlations with said power absorption measure for said first and second periodic functions, said correlations being repeated at intervals no greater than one-half period, the function of said calculating device being to recognize the occurrence of a zero-crossing time from said inphase and quadrature replica correlations, said zero-crossing time being the point in time when one function of said function pair controls the power absorption of the tag during the first half of said correlation interval and the other function of said function pair controls the power absorption during the second half of said correlation interval, the beginning of a bit period being one-half bit period after said zero-crossing time.

53. The identification reader of claim 43 wherein said information extracting means comprises a means for recognizing power absorption by a tag, a bit synchronizing means for identifying the beginnings of the bit periods for a tag, and a bit identifying means for determining whether a "0" or a "1" was communicated by the tag, said power absorption recognition process being the first of a plurality of stages comprising the information extraction process, said bit synchronization process being the second of said stages, and said bit identification process being the third of said stages.

54. The identification reader of claim 53 wherein said bit identifying means comprises a plurality of function-pair means, each of said function-pair means comprising four replica generators, four correlators, and a calculating device, the functions of said replica generators being to generate inphase and quadrature replicas, said inphase replicas being replicas of said first and second periodic functions, said quadrature replicas being replicas of said first and second periodic functions delayed by one-quarter periods, the function of said correlators being to multiply said power absorption measure by each of said replicas and to integrate the results over a correlation interval, said correlation interval extending from the present to one bit period in the past, said correlation interval coinciding with said tag bit period, thereby obtaining inphase and quadrature replica correlations with said power absorption measure for said first and second periodic functions, said correlations being repeated at intervals equal to a bit period, the function of said calculating device being to identify the power absorption function controlling the absorption of power by the tag from said inphase and quadrature replica correlations thereby identifying the bit that was communicated by the tag.

55. The identification reader of claim 43 wherein said bit period is a multiple of the periods of said first and second functions and said first and second function periods are multiples of the period of said reversing magnetic field, the beginning of said bit period coinciding with some one of said first function periods, some one of said second function periods, and some one of said reversing magnetic field periods.

56. An electronic identification reader for use with an electronic identification tag that absorbs power from a reversing magnetic field in accordance with information to be communicated to said reader, said reader operating in at least one of a plurality of modes, said modes being characterized by mode control data, said reader comprising:
 a means for storing mode control data;
 a means for generating a reversing magnetic field;
 a means for starting said generating means;
 a means for stopping said generating means;
 a means for obtaining a measure of magnetic field variations brought about by an electronic identification tag, said magnetic field variation measure representing information being communicated by said tag; and
 a means for extracting said information from said magnetic field variation measure, said information extracting means being capable of operating in a plurality of information extracting modes, each of said information extracting modes defining a specific functional relationship between said information and said time-dependent magnetic field variation brought about by said tag, said information extracting modes being characterized by said mode control data, the specification of the information extracting mode in said mode control data permitting the extraction of information from said time-dependent absorption of power by said tag.

57. The identification reader of claim 56 wherein said means for generating a reversing magnetic field includes generating said magnetic field at any one of a plurality of frequencies, said magnetic field frequency being specified in said mode control data.

58. The identification reader of claim 56 further comprising a means for mode control, said mode control means causing said information extracting means to operate in at least one of said plurality of said modes in accordance with said mode control data.

59. The identification reader of claim 58 wherein said means for mode control is at least one switch.

60. The identification reader of claim 58 wherein said means for mode control is a plug-in memory device.

61. The identification reader of claim 58 wherein said means for mode control is a reprogrammable memory device.

62. The identification reader of claim 57 further comprising a means for mode control, said mode control means causing said reversing magnetic field to be generated at a particular frequency and causing said information extracting means to operate in at least one of said plurality of said information extracting modes in accordance with said mode control data.

63. The identification reader of claims 58 or 62 wherein said mode control means causes said information extracting means to operate simultaneously in a plurality of said information extracting modes.

64. The identification reader of claims 58 or 62 wherein said mode control means causes said information extracting means to operate sequentially in a plurality of said information extracting modes.

65. The identification reader of claim 56 wherein said information extracting means comprises an analog-to-digital converter and a digital processor, the function of said analog-to-digital converter being to obtain amplitude samples of said magnetic field variation measure at discrete intervals of time and to provide digital representations of said amplitude samples to said digital processor, the function of said digital processor being to extract from said digital representations said information being communicated by a tag.

66. The identification reader of claim 65 wherein said information extracting means further comprises a notch filter tuned to the frequency of said reversing magnetic field and inserted between said means for obtaining a magnetic field variation measure and said analog-to-digital converter for the purpose of suppressing signals having the frequency of said reversing magnetic field.

67. An electronic identification system including a reader and at least one tag, each of said tags comprising:
 a means for storing information to be communicated to an electronic identification reader;
 a means for varying the absorption of power from a reversing magnetic field in accordance with said stored information, the generation of said magnetic field being started at some arbitrary time, said magnetic field being zero prior to said arbitrary time and consisting of a steady-state component and a transient component subsequent to said arbitrary time;

a means for delaying said variation in absorption of power for a predetermined period of time, said delay time being the time required for said transient associated with starting the generation of said reversing magnetic field to decrease to a level where said varying absorption of power from said reversing magnetic field is distinguishable from said transient;

said reader which operates in at least one of a plurality of modes, said modes being characterized by mode control data, said reader comprising:

a means for storing mode control data;
a means for generating a reversing magnetic field;
a means for starting said generating means;
a means for stopping said generating means;
a means for obtaining a measure of the time-dependent absorption of power from said magnetic field by an electronic identification tag, said power absorption measure representing information being communicated by said tag; and
a means for extracting said information from said power absorption measure, said information extracting means being capable of operating in a plurality of information extracting modes, each of said information extracting modes defining a specific functional relationship between said information and said time-dependent absorption of power by said tag, said information extracting modes being characterized by said mode control data, the specification of the information extracting mode in said mode control data permitting the extraction of information from said time-dependent absorption of power by said tag.

68. The identification system of claim 67 wherein said means of obtaining a measure of absorption of power in said reader comprises an envelope detecting device and a DC cancelling circuit, the input signal to said envelope detecting device being the alternating voltage appearing across said coil, the output signal of said envelope detecting device being the amplitude of said alternating coil voltage, the signal from said envelope detecting device feeding into said DC cancelling circuit, the output signal from said DC cancelling circuit being the envelope detecting device output signal diminished by the envelope detecting device output signal at some predetermined reference time after the beginning of the generation of said reversing magnetic field, said delay time in said tag being longer than said predetermined reference time of DC cancelling circuit.

69. The identification system of claim 67, said identification tag further comprising:

a means for extracting power from said reversing magnetic field, said power being used by said tag in performing its function.

70. A method of communicating information in response to the presence of a reversing magnetic field, the generation of said magnetic field being started at some arbitrary time, said magnetic field being zero prior to said arbitrary time and consisting of a steady-state component and a transient component subsequent to said arbitrary time, said method comprising the steps:

recognizing the presence of said reversing magnetic field;
waiting for a predetermined time period, said predetermined time period being the time required for the transient associated with turning on said reversing magnetic field to decrease to a level where a variable absorption of power from said reversing magnetic field is distinguishable from said transient;
absorbing power from said reversing magnetic field after said predetermined time period expires such that variation in said absorbed power is functionally related to said information to be communicated.

71. A method of receiving information that is communicated by the varying absorption of power from a reversing magnetic field by a source of uncertain location, said varying absorption of power being related to the information being communicated by one of a plurality of functional relationships, said method comprising the steps:

generating a reversing magnetic field in a region believed to be the location of said communication source;
waiting for a predetermined time period, said predetermined time period being the time required for the transient associated with turning on said reversing magnetic field to decrease to a level where said varying absorption of power from said reversing magnetic field is distinguishable from said transient;
obtaining a measure of the power absorbed from said reversing magnetic field as a function of time;
utilizing the plurality of said functional relationships to determine from said power absorption measure as a function of time whether information is being communicated, and if so, the functional relationship being employed;
omitting steps that follow this step and repeating method beginning with generating step above in a different location if information is not being communicated; otherwise,
extracting information from said power absorption measure as a function of time utilizing said functional relationship being employed.

72. The method of claim 71 comprising the additional steps:

stopping the generation of said reversing magnetic field whenever it can be determined that absorption of power by a tag is not occurring;
stopping the generation of said reversing magnetic field when said power absorption measure representing information communicated by a tag has been obtained.

73. A method of receiving information that is communicated by the varying of a magnetic field by a source of uncertain location, said variation in magnetic field being related to the information being communicated by one of a plurality of functional relationships, said method comprising the steps:

generating a reversing magnetic field in a region believed to be the location of said communication source;
waiting for a predetermined time period, said predetermined time period being the time required for the transient associated with turning on said reversing magnetic field to decrease to a level where said magnetic field variation is distinguishable from said transient;
obtaining a measure of the magnetic field variation as a function of time;

utilizing the plurality of said functional relationships that exist between said magnetic field variation and said information being communicated to determine from said magnetic field variation measure as a function of time whether information is being communicated, and if so, the functional relationship being employed;

omitting steps that follow this step and repeating method beginning with generating step above in a different location if information is not being communicated; otherwise, extracting information from said magnetic field variation measure as a function of time utilizing said functional relationship being employed.

74. The method of claim 73 comprising the additional steps:

stopping the generation of said reversing magnetic field whenever it can be determined that magnetic field variation by a tag is not occurring;

stopping the generation of said reversing magnetic field when said magnetic field variation measure representing information communicated by a tag has been obtained.

75. A method of receiving information that is communicated by the varying of a magnetic field by a source of uncertain location, said variation in magnetic field being related to the information being communicated by one of a plurality of functional relationships, said method comprising the steps:

generating a reversing magnetic field in a region believed to be the location of said communication source for a first predetermined period of time;

waiting for a second predetermined time period after said magnetic field generation stops, said second predetermined time period being the time required for the transient associated with turning off said reversing magnetic field to decrease to a level where said magnetic field variation is distinguishable from said transient;

obtaining a measure of the magnetic field variation as a function of time;

utilizing the plurality of said functional relationships that exist between said magnetic field variation and said information being communicated to determine from said magnetic field variation measure as a function of time whether information is being communicated, and if so, the functional relationship being employed;

omitting steps that follow this step and repeating method beginning with generating step above in a different location if information is not being communicated; otherwise, extracting information from said magnetic field variation measure as a function of time utilizing said functional relationship being employed.

* * * * *

UNITED STATES PATENT AND TRADEMARK OFFICE
CERTIFICATE OF CORRECTION

PATENT NO.   : 5,235,326
DATED        : August 10, 1993
INVENTOR(S)  : Beigel et al.

It is certified that error appears in the above-identified patent and that said Letters Patent is hereby corrected as shown below:

Column 27,
Line 51, replace "absorbs power from" by -- varies --.

Column 28,
Line 10, replace "absorption of power" by -- magnetic field variation --.

Signed and Sealed this

Tenth Day of February, 2004

JON W. DUDAS
*Acting Director of the United States Patent and Trademark Office*